US012757820B2

(12) United States Patent
Lundkvist et al.

(10) Patent No.: US 12,757,820 B2
(45) **Date of Patent: *Oct. 13, 2026**

(54) ROBOTIC MOWER AND METHOD, SYSTEM AND DEVICE OF PATH PLANNING THEREOF

(71) Applicant: Globe (Jiangsu) Co., Ltd., Changzhou (CN)

(72) Inventors: André Lundkvist, Habo (SE); Daniel Truong, Torshälla (SE); Jin Cao, Changzhou (CN); Wanghao Li, Changzhou (CN); Jie Gao, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 261 days.

This patent is subject to a terminal disclaimer.

(21) Appl. No.: 17/986,843

(22) Filed: Nov. 14, 2022

(65) Prior Publication Data

US 2023/0071262 A1 Mar. 9, 2023

Related U.S. Application Data

(63) Continuation of application No. PCT/CN2021/098046, filed on Jun. 3, 2021.

(30) Foreign Application Priority Data

Jun. 3, 2020 (CN) ......................... 202010493112.0
Jun. 3, 2020 (CN) ......................... 202020988949.8

(Continued)

(51) Int. Cl.
*A01D 34/00* (2006.01)
*A01B 69/04* (2006.01)

(Continued)

(52) U.S. Cl.
CPC .......... *A01D 34/008* (2013.01); *A01B 69/008* (2013.01); *G05D 1/0214* (2013.01); *G05D 1/0259* (2013.01); *A01D 2101/00* (2013.01)

(58) Field of Classification Search
CPC .............. A01D 34/008; A01D 2101/00; A01B 69/008; G05D 1/0214; G05D 1/0259; G05D 1/0265
See application file for complete search history.

(56) References Cited

U.S. PATENT DOCUMENTS

2008/0039974 A1* 2/2008 Sandin ................. G05D 1/0255 901/46
2012/0029753 A1* 2/2012 Johnson .............. B60L 15/2036 701/23

(Continued)

FOREIGN PATENT DOCUMENTS

| | | | |
|---|---|---|---|
| CN | 104703460 | A | 6/2015 |
| CN | 107966983 | A | 4/2018 |
| CN | 110018686 | A | 7/2019 |
| EP | 2413215 | A2 | 2/2012 |
| EP | 2625946 | A1 | 8/2013 |
| EP | 3346348 | A1 | 7/2018 |

OTHER PUBLICATIONS

Supplementary European Search Report for corresponding application 218178937 filed Jun. 3, 2021, Mail date Aug. 1, 2023.

*Primary Examiner* — Abby J Flynn
*Assistant Examiner* — Paulo Roberto Gonzalez Leite

(57) ABSTRACT

A path planning method includes controlling the robotic mower to exit a charging station, controlling the robotic mower to find a boundary wire or guide wire, where the boundary wire is pre-laid on the edge of the working area of the robotic mower, and the guidance line is pre-laid in the working area of the robotic mower, controlling the robotic mower to follow the boundary wire or guide wire to move until it reaches the predetermined position. With the method, tracks generated when the robotic mower exit the charging (Continued)

station along a fixed path can be avoided, and the damage to the lawn or vegetation can be reduced.

18 Claims, 27 Drawing Sheets

(30) Foreign Application Priority Data

| | | |
|---|---|---|
| Dec. 25, 2020 | (CN) | 202011561171.3 |
| Dec. 25, 2020 | (CN) | 202011563806.3 |
| Dec. 25, 2020 | (CN) | 202023200854.4 |

(51) Int. Cl.

*A01D 101/00* (2006.01)
*G05D 1/00* (2024.01)

(56) References Cited

U.S. PATENT DOCUMENTS

| | | | | |
|---|---|---|---|---|
| 2013/0025248 | A1* | 1/2013 | Kraft | A01D 34/008 701/25 |
| 2013/0066484 | A1 | 3/2013 | Markusson | |
| 2016/0057925 | A1* | 3/2016 | Letsky | G05D 1/0088 701/23 |
| 2016/0282868 | A1* | 9/2016 | Yamamura | G05D 1/0274 |
| 2019/0369620 | A1* | 12/2019 | Zhou | G05D 1/248 |
| 2020/0142425 | A1* | 5/2020 | Strandberg | A01D 69/02 |
| 2020/0356110 | A1* | 11/2020 | Holgersson | A01D 34/008 |
| 2021/0116911 | A1* | 4/2021 | Pjevach | H01M 10/0525 |
| 2021/0302985 | A1* | 9/2021 | Ko | G05D 1/247 |
| 2023/0085538 | A1* | 3/2023 | Lundkvist | G05D 1/0265 56/10.2 A |

* cited by examiner

ROBOTIC MOWER AND METHOD, SYSTEM AND DEVICE OF PATH PLANNING THEREOF

CROSS REFERENCE TO RELATED APPLICATION

The present application is continuation application of PCT application filing PCT/CN2021/098046 on Jun. 3, 2021, which claims the benefit of priority of the following commonly-owned, presently-pending Chinese patent applications: serial No. CN202011563806.3, filed on Dec. 25, 2020; serial No. CN202011561171.3, filed on Dec. 25, 2020; serial No. CN202023200854.4, filed on Dec. 25, 2020; serial No. CN202010493112.0, filed on Jun. 3, 2020; Ser. No. 202020988949.8, filed on Jun. 3, 2020; the disclosures of which are hereby incorporated by reference herein in their entirety for all purposes.

TECHNICAL FIELD

The disclosure relates to a robotic mower, in particular to a robotic mower and a path planning method, system and device of the robotic mower.

BACKGROUND

A robotic mower is a garden tool used to mow, vegetation, etc. It usually includes a self-propelled mechanism, a cutter mechanism, and a power source. The power source can be a gasoline engine, a battery pack, and so on. Battery-driven robotic mowers are popular among users because of low noise and zero pollution. However, due to restriction of factors such as battery energy density and battery production cost, the power of the battery pack carried by the robotic mower is very limited, resulting in a small operating area of the robotic mower. When the lawn area is large, the robotic mower needs to return to the charging station for charging after working for a certain period of time. After the charging is completed, the robotic mower will leave the charging station and return to the working area for mowing.

When the robotic mower leaves the charging station and returns to the mowing area to work, most of the mowers leave the station along a fixed track, which is not only prone to rutting, which affects the growth of lawn or vegetation in the rutting area, but also cause more mowing in the same path, which affects the overall mowing efficiency and the beauty of the lawn.

The method of conventional smart mowers returning to the charging has the following problems: when the working area is large, smart mowers need to move many times between charging station and the work area, causing certain damage to the lawn. In addition, it will also reduce the service life of the battery core of the smart mower and increase the working cost. When there are many obstacles in the working area, the smart mower must avoid the obstacles, which results in a longer path back to the charging station and consuming more power, and the smart mower cannot return to the charging station for charging normally.

SUMMARY

In view of the above shortcomings of the existing art, the disclosure is to provide a robotic mower and a path planning method, system and device of the robotic mower, which are used to solve the technical problems in the conventional art that the robotic mower is prone to rutting when the robotic mower leaves the charging station and returns to the mowing area to work and the same path is more mowed.

In order to achieve the above objects and other related objects, the disclosure provides a path planning method of a robotic mower, the path planning method includes:

- controlling the robotic mower to exit a charging station,
- controlling the robotic mower to find a boundary wire or a guide wire, the boundary wire being pre-laid on an edge of a working area of the robotic mower and the guidance line being pre-laid in the working area of the robotic mower, and
- controlling the robotic mower to follow the boundary wire or the guide wire to move until the robotic mower reaches a predetermined position.

In an embodiment, controlling the robotic mower to follow the boundary wire to move until the robotic mower reaches the predetermined position includes:

- controlling the robotic mower to straddle along the boundary wire until the robotic mower finds a straight boundary area of the boundary wire,
- controlling the robotic mower to reverse by a second random backward distance, the second random backward distance being less than or equal to a length of the straight boundary area, and
- controlling the robotic mower to follow the boundary wire to move to the predetermined position.

In an embodiment, the predetermined position is an random point with a first preset distance from the boundary wire,

- controlling the robotic mower to follow the boundary wire to move to the predetermined position includes:
- controlling the robotic mower to rotate a second preset angle toward a center of the working area,
- controlling the robotic mower to move forward until the distance between the robotic mower and the boundary wire is the first preset distance;
- controlling the robotic mower to reverse the second preset angle to keep a moving direction of the robotic mower unchanged before and after adjustment, and
- controlling the robotic mower to follow the boundary wire at the first preset distance to move until the robotic mower reaches the predetermined position.

In an embodiment, control the robotic mower to exit the charging station includes:

- controlling the robotic mower to start to exit the charging station after the charging is completed, and
- controlling the robotic mower to continue straight backward for a first random backward distance when the robotic mower exits the outside of a charging station loop arranged in the charging station.

In an embodiment, controlling the robotic mower to find the boundary wire includes:

- controlling the robotic mower to rotate to any side of the charging station at a first preset angle,
- controlling the robotic mower to follow a guidance of the charging station loop to move to the boundary wire,
- controlling the robotic mower to stop moving when the robotic mower is partially located outside the boundary wire, and
- controlling the robotic mower to rotate to a side away from the charging station until at least half of the robotic mower is located inside the boundary wire.

In an embodiment, the method includes that controlling the robotic mower to start mowing within the working area defined by the boundary wire after reaching the predetermined position.

In an embodiment, the method includes that controlling the robotic mower to start mowing in a random manner within the working area defined by the boundary wire after reaching the predetermined position.

In an embodiment, controlling the robotic mower to follow the guide wire until the robotic mower reaches the predetermined position includes:

controlling the robotic mower to straddle along the guide wire for a preset time, and controlling the robotic mower to follow the guide wire to the predetermined position at a first random distance.

In an embodiment, controlling the robotic mower to find the guide wire and to make the robotic mower face a direction away from the charging station includes:

determining a relative position of the robotic mower and the guide wire, and adjusting a position of the robotic mower according to the relative position of the robotic mower and the guide wire, so that the robotic mower can faces the direction away from the charging station.

In an embodiment, the path planning method includes a return path planning method, and the return path planning method includes:

obtaining a virtual working area map corresponding to the working area of the robotic mower, obtaining virtual positions of the robotic mower and the charging station in the virtual working area map according to current positions of the robotic mower and the charging station, and planning a return path of the robotic mower according to the virtual positions, including: planning an X-axis direction path with the virtual position of the charging station as a starting point and planning a Y-axis direction path with the virtual position of the robotic mower as a starting point, obtaining the return path when the X-axis direction path intersects with the Y-axis direction path.

In an embodiment, the virtual working area map is divided into a plurality of virtual grids, and the X-axis direction path and the Y-axis direction path are planned along the virtual grids.

In order to achieve the above objects and other related objects, the disclosure provides a path planning method of a robotic mower, including:

controlling the robotic mower to exit a charging station, controlling the robotic mower to find a boundary wire, wherein the boundary wire is pre-laid on an edge of a working area of the robotic mower, and controlling the robotic mower to follow the boundary wire until the robotic mower reaches a predetermined position, wherein, controlling the robotic mower to follow the boundary wire until the robotic mower reaches the predetermined position includes:

controlling the robotic mower to straddle along the boundary wire until the robotic mower finds a straight boundary area of the boundary wire, controlling the robotic mower to reverse by a second random backward distance, the second random backward distance bring less than or equal to a length of the straight boundary area, and controlling the robotic mower to follow the boundary wire to move toward the predetermined position.

In order to achieve the above objects and other related objects, the disclosure provides a path planning method of a robotic mower, the path planning method includes: controlling the robotic mower to exit a charging station, controlling the robotic mower to find a guide wire and make the robotic mower face a direction away from the charging station, wherein the guide wire is pre-laid in a working area of the robotic mower, and controlling the robotic mower to follow the guide wire to move until the robotic mower reaches the predetermined position, wherein, controlling the robotic mower to follow the guide wire until the robotic mower reaches the predetermined position includes:

controlling the robotic mower to straddle along the guide wire for a preset time, and controlling the robotic mower to follow the guide wire to the predetermined position at a first random distance.

In order to achieve the above objects and other related objects, the disclosure provides a path planning system of a robotic mower, the path planning system includes:

a charging station exit module, which is used to control the robotic mower to exit a charging station, a searching module, which is used to control the robotic mower to find a boundary wire or a guide wire, wherein the boundary wire is pre-laid on an edge of a working area of the robotic mower, and the guide wire is pre-laid in the working area of the robotic mower, and a following module, which is used to control the robotic mower to follow the boundary wire or the guide wire to move until the robotic mower reaches a predetermined position.

In an embodiment, the path planning system of the robotic mower further includes a return path planning module, and the return path planning module is configured to:

obtain a virtual working area map corresponding to the working area of the robotic mower, obtain virtual positions of the robotic mower and the charging station on the virtual working area map according to current positions of the robotic mower and the charging station, and plan a return path of the robotic mower according to the virtual positions, including: planning an X-axis direction path with the virtual position of the charging station as a starting point, planning a Y-axis direction path with the virtual position of the robotic mower as a starting point, and obtaining the return path when the X-axis direction path intersects with the Y-axis direction path.

In an embodiment, the path planning system of the robotic mower includes a mowing operation module, which is used to control the robotic mower to start mowing within the working area defined by the boundary wire after reaching the predetermined position.

In order to achieve the above objects and other related objects, the disclosure provides a robotic mower, the robotic mower includes:

a body, at least one sensor arranged at a front end of the body, and a control unit, which is arranged on the body, wherein the control unit includes a processor and a memory coupled to each other, and the memory stores program instructions, when the program instructions stored in the memory are executed by the processor, the control unit can realize:

controlling the robotic mower to exit a charging station, controlling the robotic mower to find a boundary wire or a guide wire, wherein the boundary wire is pre-laid on an edge of the working area of the robotic mower and the guidance line is pre-laid in the working area of the robotic mower, and controlling the robotic mower to follow the boundary wire or the guide wire to move until the robotic mower reaches a predetermined position.

In order to achieve the above objects and other related objects, the disclosure provides a storage medium, the storage medium includes:

a program, wherein when the program is run on a computer, the computer is configured to:

control a robotic mower to exit a charging station, control the robotic mower to find a boundary wire or a guide wire, wherein the boundary wire is pre-laid on an edge of a working area of the robotic mower and the guidance line is pre-laid in the working area of the robotic mower, and control the robotic mower to follow the boundary wire or the guide wire to move until the robotic mower reaches a predetermined position.

In order to achieve the above objects and other related objects, the disclosure provides a path planning device of a robotic mower, the path planning device includes:

the robotic mower, including a body, a control unit and at least one sensor arranged on the body, wherein the sensor is arranged at a front edge of the body, a boundary wire, which is pre-laid on an edge of the working area of the robotic mower, and a charging station, which is located on the boundary wire, wherein a charging station peripheral loop is provided in the charging station, wherein the sensor is used to detect a guiding signal of the boundary wire and/or the charging station outfield field loop, and the control unit is used to control the robotic mower to automatically leave the charging station according to the guiding signal.

In an embodiment, the path planning device of the robotic mower further includes at least one guide wire pre-laid in the working area of the robotic mower, two ends of the guide wire are respectively connected to the charging station and the boundary wire, and the guide wire and the boundary wire define a closed loop.

In an embodiment, the guiding signal includes an alternating magnetic field, and the sensor includes a magnetic induction coil.

In an embodiment, the number of the sensors is two, the two sensors are symmetrically arranged on both sides of a center line of a front end of the body.

The robotic mower and the path planning method, system and device of the robotic mower of the disclosure can be used to plan the path for the robotic mower to leave the charging station, so that the robotic mower can leaves the charging station along a different path each time, which avoids tracks caused by the robotic mower mowing repeatedly along a fixed path and avoid affecting the growth of lawn or vegetation in the rutting area The robotic mower and its path planning method, system and device of the disclosure can be used to plan the path for the robotic mower to leave the charging station, so that the robotic mower can leaves the charging station along a different path each time, which avoids the robotic mower mowing repeatedly along the same path, improves the mowing efficiency, and enhances the beauty of the lawn.

The robotic mower and its path planning method, system and device of the disclosure simplify the path planning of the robotic mower from the charging station by setting the guide wire, since the guide wire can be arranged in a relatively simple shape according to needs.

The robotic mower and its path planning method, system and device of the disclosure define a virtual working area map corresponding to the working area of the robotic mower, and respectively plan the X-axis direction path and the Y-axis direction path on the virtual working area map to generate a return path. With this setting, the return path has been planned when to recharge, which effectively avoids obstacles in the working area, and prevents the battery of the robotic mower from being exhausted before returning to the charging station. By planning a shorter return path, the power of recharging that needs to be reserved is reduced, the recharging time is saved, and the working time of the smart mower is increased.

DETAILED DESCRIPTION

The following describes the implementation of the disclosure through specific examples, and those skilled in the art can easily understand other advantages and effects of the disclosure from the content disclosed in this specification. The disclosure can also be implemented or applied through other different specific embodiments, and various details in this specification can also be modified or changed based on different viewpoints and applications without departing from the spirit of the disclosure.

Please refer to FIG. 1 through FIG. 38. It should be noted that the diagrams provided in this embodiment only illustrate the basic idea of the disclosure in a schematic manner. The figures only show the components related to the disclosure instead of the number, shape, and size drawing of the components in actual implementation. In its actual implementation, the type, quantity, and ratio of each component can be changed at will, and its component layout type may also be more complicated.

The First Embodiment

Figure 1:
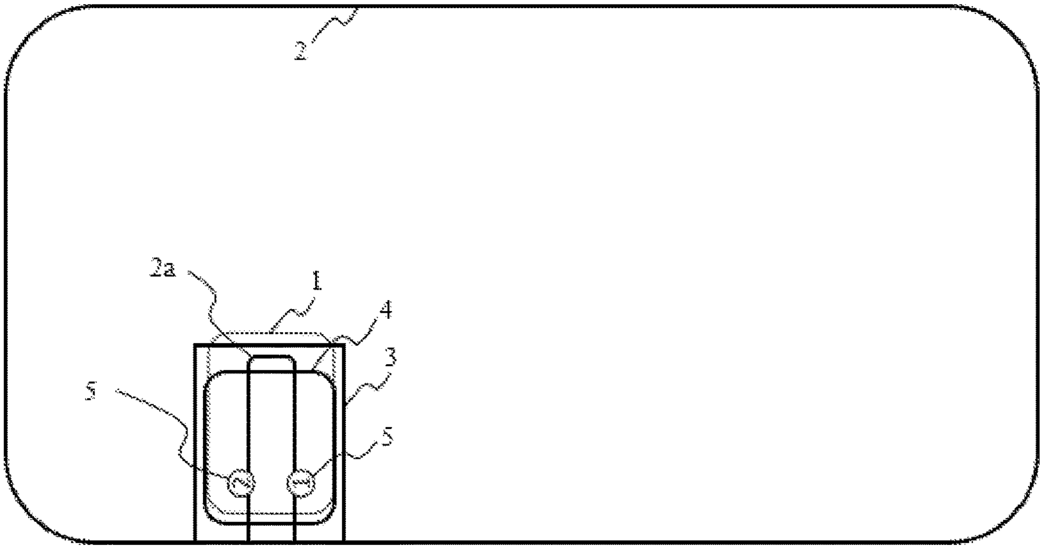
FIG. 1 is a schematic structural view of a path planning device of a robotic mower moving out from a charging station according to an embodiment of the disclosure.
Figure 2:
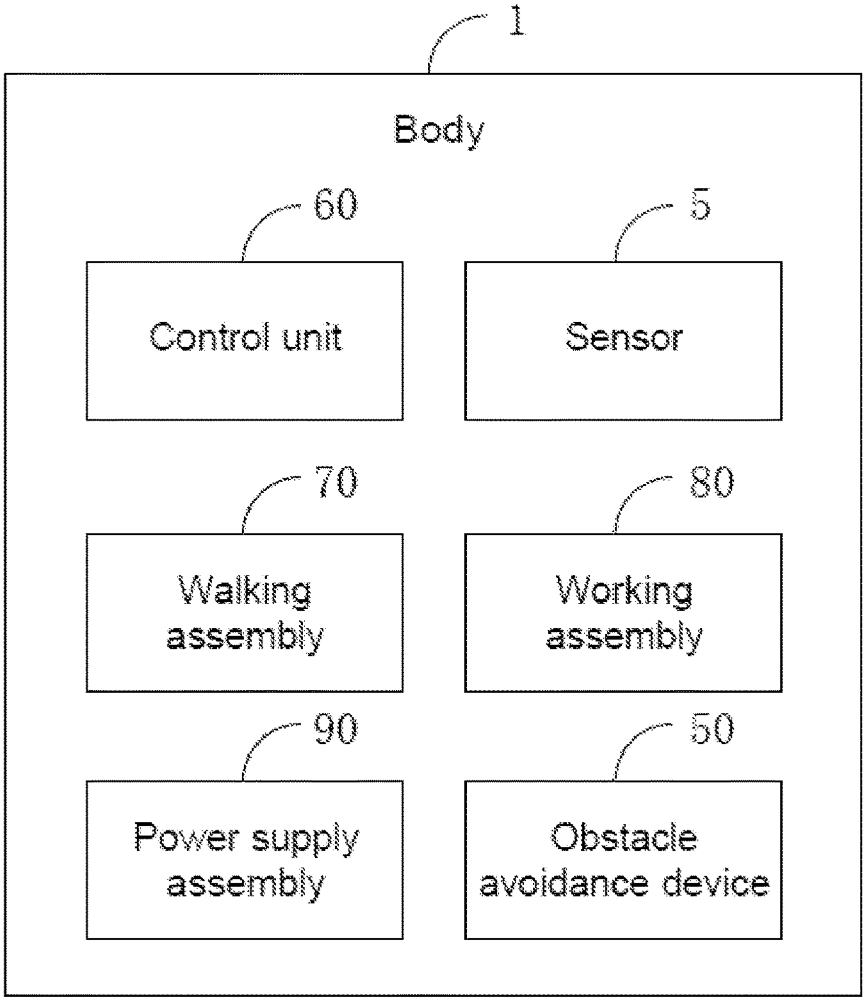
FIG. 2 is a schematic block view of a robotic mower according to an embodiment of the disclosure.
Figure 3:
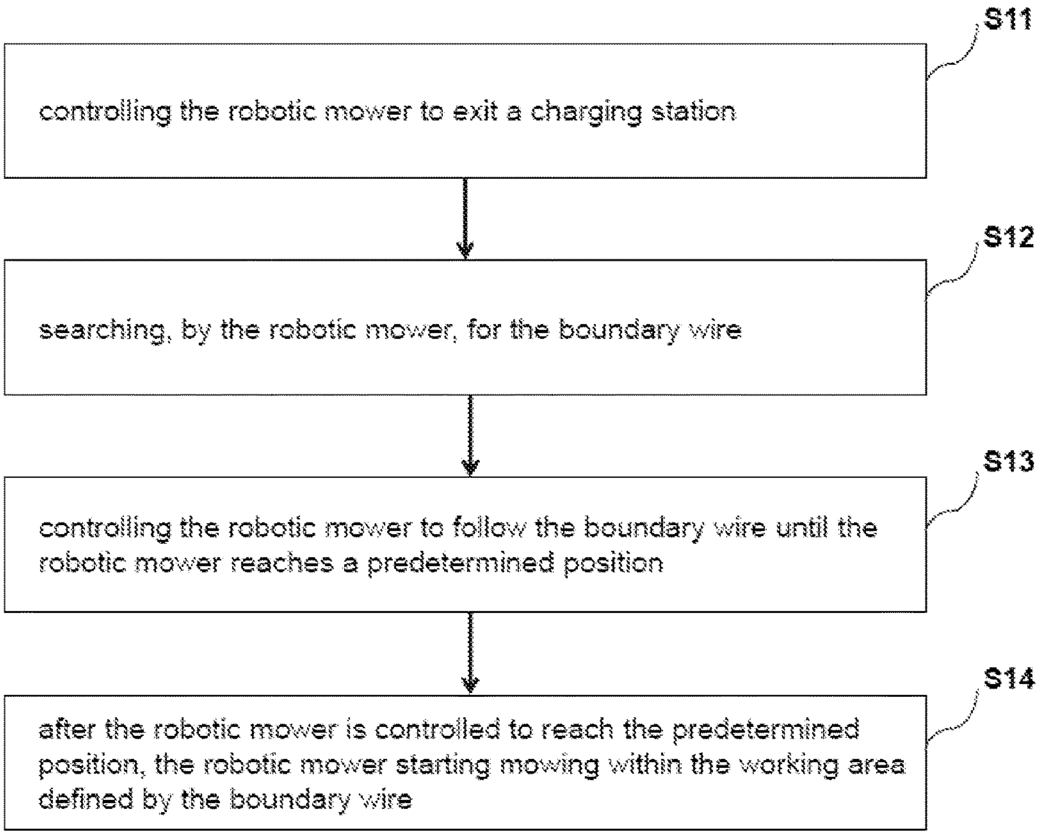
FIG. 3 is a schematic flow chart of a path planning method for a robotic mower according to an embodiment of the disclosure.

Electric-driven automatic mowers need to frequently return to a charging station for charging. After charging, when the robotic mowers leave the charging station and return to the mowing area for working, in order to avoid tracks generated by the robotic mowers when leaving the charging station along fixed path and problems of more mowing on the same path, this embodiment discloses a path planning method, system and device of a robotic mower to leave a charging station. FIG. 1 shows a schematic structural view of a path planning device of a robotic mower of this embodiment, FIG. 2 shows a schematic block view of the robotic mower of this embodiment, FIG. 3 shows a schematic flow chart of the path planning method of the robotic mower of this embodiment, FIG. 19 shows a path planning system and a schematic block view of the robotic mower of this embodiment. It should be noted that, in order to make the drawings more clear, the robotic mower and the charging station are enlarged and shown in FIG. 1 and FIG. 7 through FIG. 18. In this embodiment, the robotic mower includes a self-propelled automatic mower, the robotic mower is a battery-powered electric tool that needs to be charged regularly. The robotic mower can move within a working area defined by a boundary wire during use.

Please refer to FIG. 1 and FIG. 2. In this embodiment, the path planning device, for the robotic mower 1 out of the charging station, includes the robotic mower 1, a wire 2, a wire 7 (not shown in FIG. 1, please refer to FIG. 22), an obstacle avoidance sensor 50, and a charging station 3. The robotic mower 1 includes a body, a control unit 60 arranged on the body, and at least one sensor 5 (FIG. 1 shows that the robotic mower 1 includes two sensors 5). The sensor 5 is used to detect a guiding signal from at least one of the boundary wire 2, the wire 7, or a charging station loop 4. The control unit 60 is used for controlling the robotic mower 1 to leave the charging station 3 according to the guiding signal. The charging station 3 is located on the wire 2. The charging station 3 is set as a charging board to facilitate the robotic mower 1 to be on a uniform and continuous plane when docking and to ensure a more accurate docking process. In order to facilitate the robotic mower 1 to identify the position of the charging station 3, the charging station loop 4 is set in the charging station 3, and the boundary wire 2 is recessed into the inner working area at the position of the charging station 3 to define a boundary loop 2*a* that is narrower than the charging station loop 4 and passes through the charging station loop 4. The boundary loop 2*a* is used to guide the robotic mower to exit the charging station.

In this embodiment, the obstacle avoidance sensor 50 is used to detect obstacles on the moving path of the robotic mower 1, and then transmits the signal to the control unit 60. The control unit 60 controls the robotic mower 1 to implement an obstacle avoidance operation, so as to avoid obstacles. The obstacle avoidance sensor 50 may be, for example, an infrared sensor, a laser sensor, or a collision sensor, etc. The collision sensor can be a sensor mainly composed of a magnet and a Hall sensor, or a sensor mainly composed of an armature or an inductive sensor. Taking a collision sensor mainly composed of a magnet and a Hall sensor as an example, the magnet or the Hall sensor can be installed on two parts of the robotic mower 1. The two parts can be a top cover and a housing of the robotic mower 1.

When the robotic mower 1 collides, one of the two parts (such as the top cover) can move a certain distance forward in a direction of the robotic mower 1 relative to another part (such as the housing) under the action of inertia, so that the relative displacement of the magnet and the Hall sensor may happen, which further cause that a signal of the Hall sensor change. At this time, the Hall sensor can send the signal to the control unit 60, and the control unit 60 controls the robotic mower 1 to realize an obstacle avoidance operation so as to avoid obstacles, so that the robotic mower 1 has an obstacle avoidance function in the process of following the guide wire 7 to leave the charging station 3.

Please refer to FIG. 1, in this embodiment, the boundary wire 2 may be located under the ground along an edge of the working area. Of course, the boundary wire 2 may also be set on the ground surface or on the ground. The boundary wire 2 may be, for example, a single-core metal cable (for example, a copper cable) or a multi-strand cable. The guide wire 7 is pre-laid in the working area of the robotic mower 1. Two ends of the guide wire 7 are connected to the charging station 3 and the boundary wire 2 respectively. An end of the guide wire 7 connected to the charging station 3 is also connected to the boundary wire 2, so that the guide wire 7 and a relatively short part of the boundary wire 2 located between the two ends of the guide wire 7 together form a closed loop (see FIG. 22). The boundary wire 2 (including the boundary loop 2*a*), the guide wire 7, and the charging station loop 4 are respectively coupled to a signal generating device set in the charging station 3. The signal generating device is used to generate a certain frequency pulse current signal and input the generated signal into the boundary wire 2, the guide wire 7 or the charging station loop 4 to form a guiding signal in the boundary wire 2, the guide wire 7 or the charging station loop 4, and the guiding signal generated by the boundary wire 2, the pilot line 7 or the charging station loop 4 needs to have its own special characteristics to distinguish the signal. For example, pulse current signals can be input to the boundary wire 2, the guide wire 7 and the charging station loop 4 respectively in an interval manner, so that the boundary wire 2, the guide wire 7 and the charging station loop 4 can respectively produce corresponding guiding signals in different time intervals. The sensor 5 may be, for example, a magnetic field sensor 5 or a current sensor 5 in order to measure the guiding signal of at least one of the boundary wire 2, the guide wire 7 or the charging station loop 4.

Please refer to FIG. 2, the robotic mower 1 further includes a moving assembly 70, a working assembly 80 and a power supply assembly 90 arranged on the body. The moving assembly 70 includes driving wheels located on both sides of the body. The driving wheels are generally located at the rear of the body. The two driving wheels are driven by two driving motors respectively. At least one supporting wheel is also provided in the front of the body. Automatic mower 1 is supported by the driving wheels and the supporting wheel to move. For example, the supporting wheel can be a universal wheel. The control unit 60 controls a moving direction and a speed of the robotic mower 1 by controlling rotation speeds of the two driving motors. When the rotation speeds of the driving motors are different, the robotic mower 1 can realize turning. When the rotation speeds of the driving motors are the same, the robotic mower 1 can realize straight movement, and when the rotation speeds of the driving motors are opposite, the robotic mower 1 realizes zero-position turning in situ. The working assembly 80 includes a cutting motor and a cutting head driven by the cutting motor. The working assembly 80 is approximately located at the center of the robotic mower 1. A rotation axis of the cutting motor is approximately perpendicular to the horizontal plane. The working assembly 80 can be adjusted in height from the ground by an operator to realize an adjustment of a cutting height. The power supply assembly 90 includes a rechargeable battery and a charging system for supplying power to the rechargeable battery. The control unit 60 receives various signals sent to the robotic mower 1 or signals collected by the sensor 5, and generates corresponding control signals through a built-in processor 61. The moving unit or the working unit is controlled according to the generated control signals, so that the robotic mower 1 can leave the charging station 3 along the planned path for mowing. The robotic mower 1 can leave the charging station 3 according to the path planning method of the robotic mower, the path planning system of the automatic lawn mower or the planned path below, or automatic mower 1 can leave the charging station 3 according to the path planned by other suitable methods.

It should be noted that an alarm device (not shown) is also provided on the body of the robotic mower 1. The alarm device is used to give an alarm when errors or unexpected situations occur, or to send the alarm information to the user's terminal device wirelessly. After the user receives the alarm signal, the user can eliminate the errors or deal with unexpected situations in time, so that the robotic mower 1 can work normally. Unexpected situations may be, for example, that the robotic mower 1 is stuck in a certain terrain, cannot cross obstacles, cannot find a guide wire, cannot find a boundary wire, and has insufficient power to return to a charging station.

In this embodiment, it is illustrated as an example that the guiding signal is an alternating magnetic field and the sensor 5 is a magnetic induction coil. It is understandable that in the embodiment of the path planning method and system of the robotic mower, other suitable guiding signal forms or different types of sensors 5 can also be used. For example, the signal generating device can input an alternating pulse current signal into the boundary wire 2, the guide wire 7 or the charging station loop 4, so as to generate an alternating magnetic field around the boundary wire 2, the guide wire 7 or the charging station loop 4. The sensor 5 may be a magnetic induction coil, for example. The sensing principle is: that according to the magnetic induction effect, when an alternating pulse current is input to the boundary wire 2, the guide wire 7 or the charging station loop 4, an alternating magnetic field can be produced around the boundary wire 2 or the charging station loop 4. When the magnetic induction coil is located near the boundary wire 2, the guide wire 7 or the charging station loop 4, the magnetic induction coil will generate an induced electromotive force in the alternating magnetic field, so that an induced current will be generated in the magnetic induction coil, and the induced current is filtered and amplified and then sent to the control unit 60 of the robotic mower 1. The control unit 60 can determine the position and orientation of the robotic mower 1 relative to the boundary wire 2 or the charging station loop 4 according to the magnitude and polarity of the induced current. On a side of boundary wire 2, guide wire 7 or charging station loop 4, the closer to the boundary wire 2 or charging station loop 4, the greater the magnetic field intensity is, which means that the closer the magnetic induction coil is to the boundary wire 2, the guide wire 7 or the charging station loop 4, the greater the induced current output. Since the magnetic induction coil is installed and fixed on the robotic mower 1, a distance between the automatic lawn mower 1 and the boundary wire 2, the guide wire 7 or the charging station loop 4 can be obtained according to the magnitude of the induced current. Since a direction of the magnetic field on both sides of the boundary wire 2, the guide wire 7 or the charging station loop 4 is opposite, when the magnetic induction coil is on both sides of the boundary wire 2, the guide wire 7 or the charging station loop 4, the polarity of the induced current is opposite (one side is positive and the other side is negative). Therefore, it can be determined whether the magnetic induction coil of the robotic mower 1 has crossed the boundary wire 2, the guide wire 7 or the charging station loop 4 according to the change in the polarity of the induced current of the magnetic induction coil. It should be noted that alternating current pulse signals can avoid the interference of additional magnetic fields because the current pulse signal allows the sensor 5 of the robotic mower 1 to receive the signal (alternating magnetic field signal) at different time, short time intervals and only within the corresponding time interval, so that the system can filter out other magnetic field noise signals that will interfere with the function of the robotic mower 1. The following will take the sensor 5 as a magnetic induction coil and the guiding signal generated by the boundary wire 2 or the charging station loop 4 as an alternating magnetic field as an example to illustrate the technical solution of this embodiment.

FIG. 3 shows the path planning method of the robotic mower 1 used for the robotic mower 1 to leave the charging station 3 in this embodiment. The guiding signals of the boundary wire 2 and the charging station loop 4 are detected by two magnetic induction coils arranged at the front end of the robotic mower 1 to realize the robotic mower 1 leaving the charging station 3. Two magnetic induction coils are respectively arranged on both sides of the centerline of the front end of the robotic mower 1, which are defined as a first sensor (indicated by 1) in FIG. 1 and FIG. 7 through FIG. 19) and a second sensor (Indicated by (2) in FIG. 1 and FIG. 7 through FIG. 19). The first sensor and the second sensor can be arranged symmetrically or asymmetrically. The path planning method of the robotic mower includes the following steps: S11, controlling the robotic mower 1 to exit the charging station 3, S12, searching, by the robotic mower 1, for the boundary wire 2, S13, controlling the robotic mower 1 to follow the boundary wire 2 until the robotic mower 1 reaches a predetermined position, S14, after the robotic mower 1 is controlled to reach the predetermined position, the robotic mower 1 starting mowing within the working area defined by the boundary wire 2. FIG. 7 through FIG. 19 respectively correspond to schematic views indicating the position and orientation of the robotic mower 1 in the working area in different operations of the path planning method of the robotic mower. The path planning method of the robotic mower of the embodiments will be described below with reference to FIG. 7 through FIG. 19.

Firstly, S11 is executed to control the robotic mower 1 to exit the charging station 3 according to the sensor 5 sensing the guiding signal of the charging station loop 4. After the robotic mower 1 is fully charged, it needs to exit the charging station 3 and keep a certain distance from the charging station 3. Specifically, as shown in FIG. 1, when the charging is completed, the robotic mower 1 starts to exit from the charging station 3. When the sensor 5 detects that the polarity of the guiding signal of the charging station loop 4 is reversed (the polarity of the induced current of the sensor 5 is reversed), it means that the robotic mower 1 exits outside of the charging station loop 4 (please refer to FIG. 7). At this time, the robotic mower 1 continues to go straight backward for a random distance (a first random backward distance) and then stops moving (please refer to FIG. 8). Since the robotic mower 1 reverses at a random distance, it can ensure that the robotic mower 1 will not always follow the same tracks when looking for the boundary wire 2 (S12). It can avoid rutting which will damage the grass or vegetation in the working area.

Figure 4:
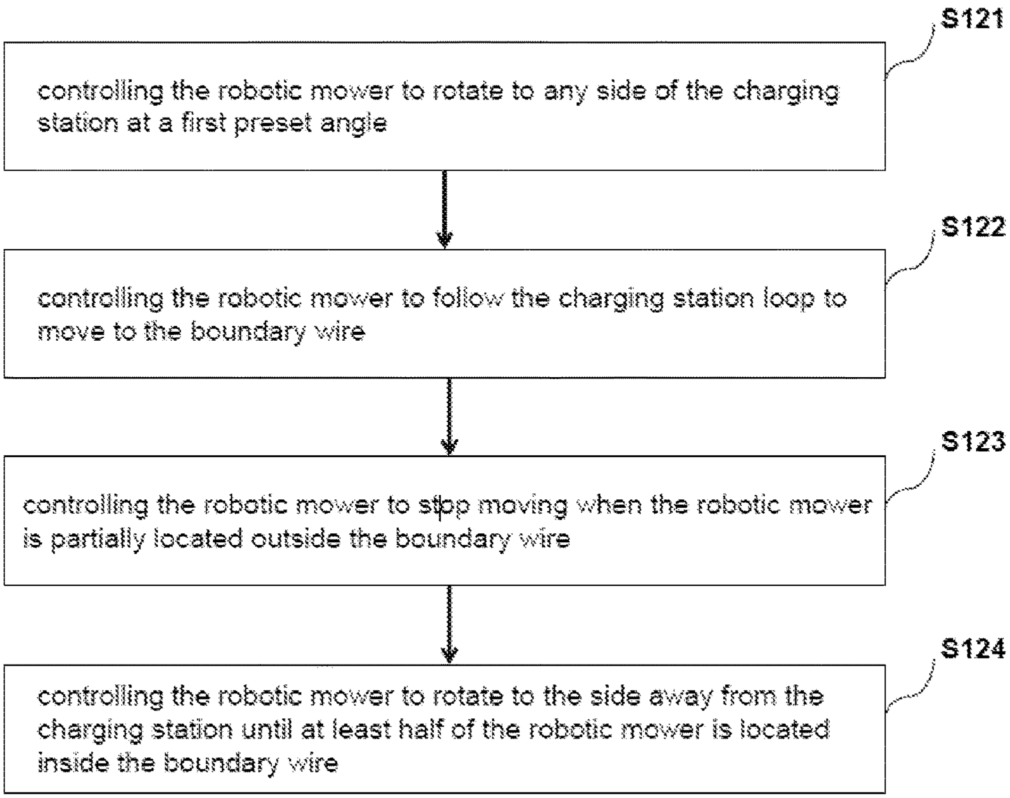
FIG. 4 is a schematic sub-flowchart of step S12 in FIG. 3.

Then, S12 is executed to control the robotic mower 1 to search for the boundary wire 2 according to the guiding signal of the charging station loop 4 and the boundary wire 2. As shown in FIG. 4, S12 may further include, S121, controlling the robotic mower 1 to rotate to any side of the charging station 3 at a first preset angle, S122, controlling the robotic mower 1 to follow the charging station loop 4 to move to the boundary wire 2, S123, when the robotic mower 1 is partially located outside the boundary wire 2, controlling the robotic mower 1 to stop moving, S124, controlling the robotic mower 1 to rotate to the side away from the charging station 3 until at least half of the robotic mower 1 is located inside the boundary wire.

Figure 9:
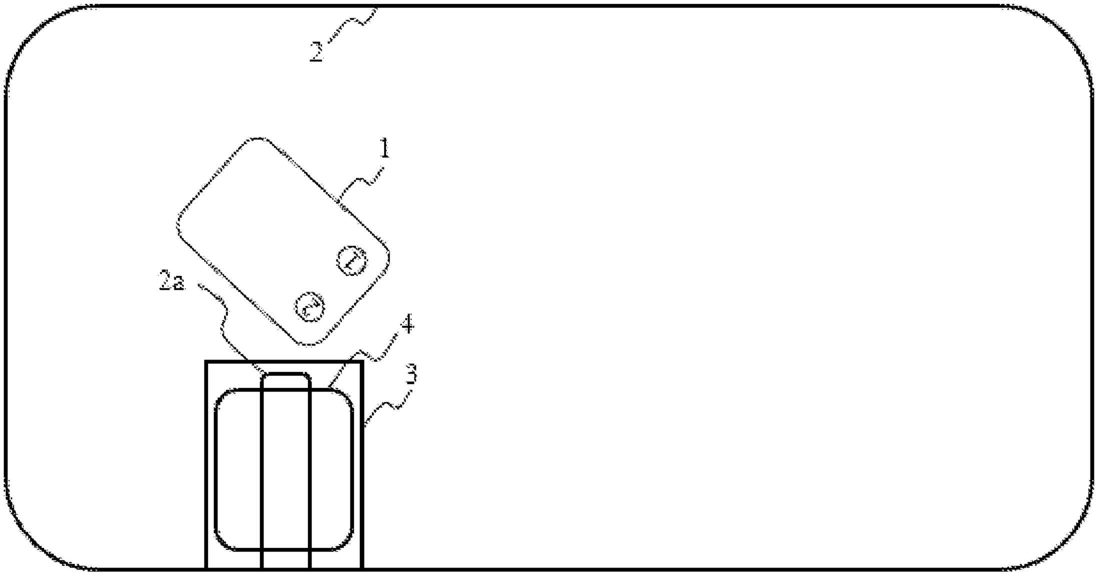
FIG. 9 is a schematic view of a robotic mower rotating to any side of a charging station at a first preset angle according to an embodiment of the disclosure.

S121 is executed to control the robotic mower 1 to rotate to the left or right of the charging station 3 at a first preset angle, and the robotic mower 1 starts to measure the moving distance from this time. It should be noted that the left or right rotation of the robotic mower 1 depends on that the robotic mower 1 leaving along the left or right side of the boundary wire 2. The first preset angle may be, for example, a set value between 0° and 90°, such as 30°, 45°, 60°, or 90°, etc. It can be understood that the first preset angle can also adopt a random value between 0° and 90°. FIG. 9 shows the robotic mower 1 rotates to the right side of the charging station 3, and then automatic mower 1 will leave along the boundary wire 2 on the right side of the charging station 3.

Figure 10A:
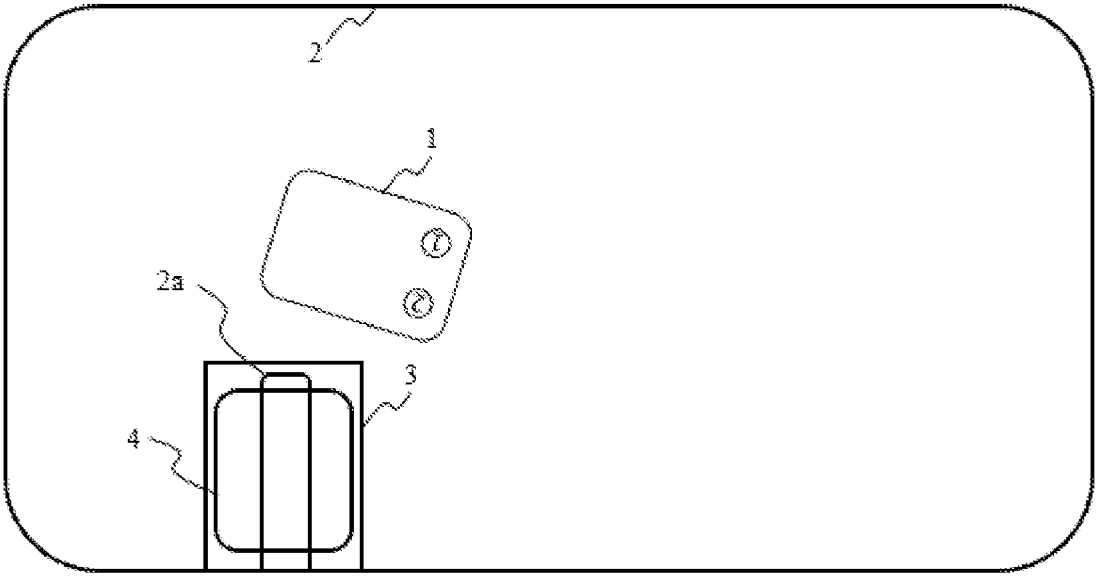
FIGS. 10*a* to 10*c* are schematic views of the movements of a robotic mower to an boundary wire by following a guidance of a charging station loop set in a charging station according to an embodiment of the disclosure.
Figure 10B:
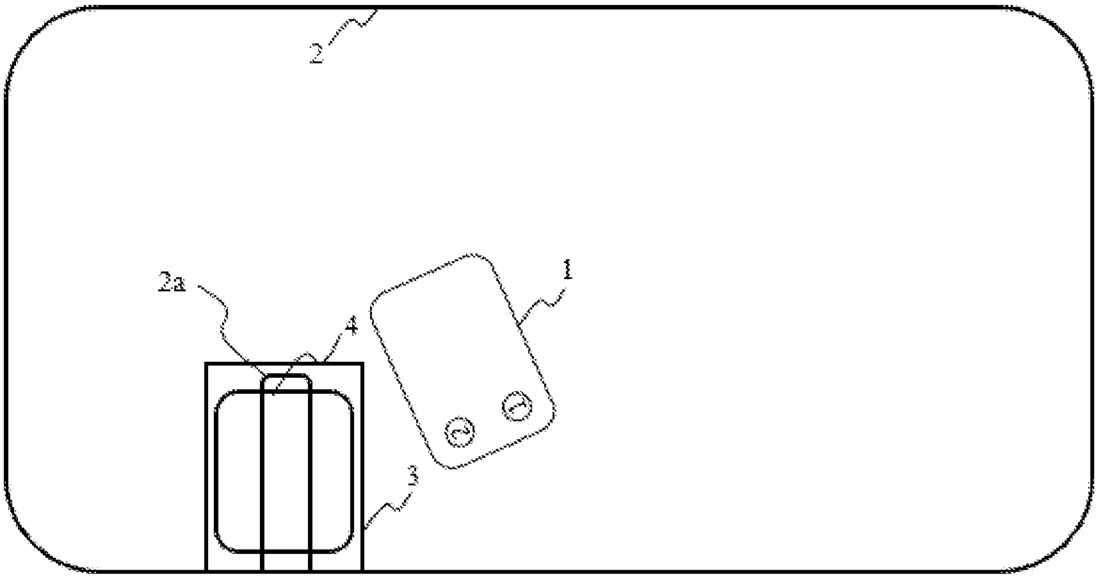
Figure 10C:
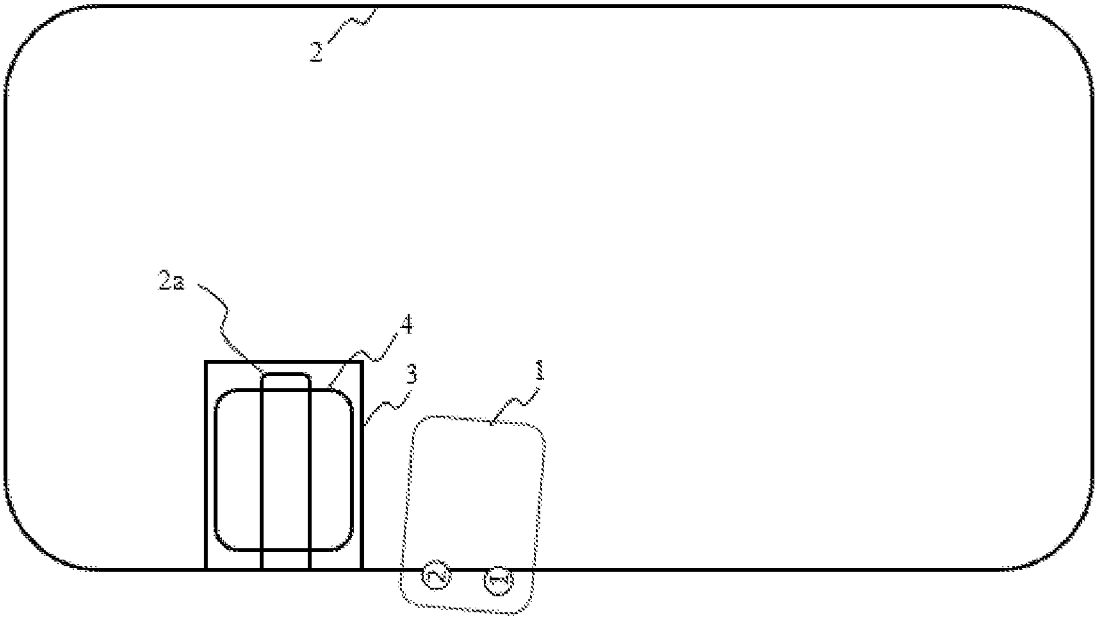

S122 is executed that after the robotic mower 1 is turned at a first preset angle, the robotic mower 1 is controlled to use one of the sensors 5 to sample the guiding signal of the charging station loop 4 to obtain the induced current signal, and follow the charging station loop 4 to the boundary wire 2 with the amplitude of the induced current signal, as shown in FIG. 10*a* through FIG. 10*c*.

S123 is executed that when one sensor 5 (such as the first sensor in FIG. 10*c*) is detected to cross the boundary wire 2, it means that the robotic mower 1 is partially located outside the boundary wire 2, and then the robotic mower 1 is controlled to stop moving, as shown in FIG. 10*c*.

Figure 11:
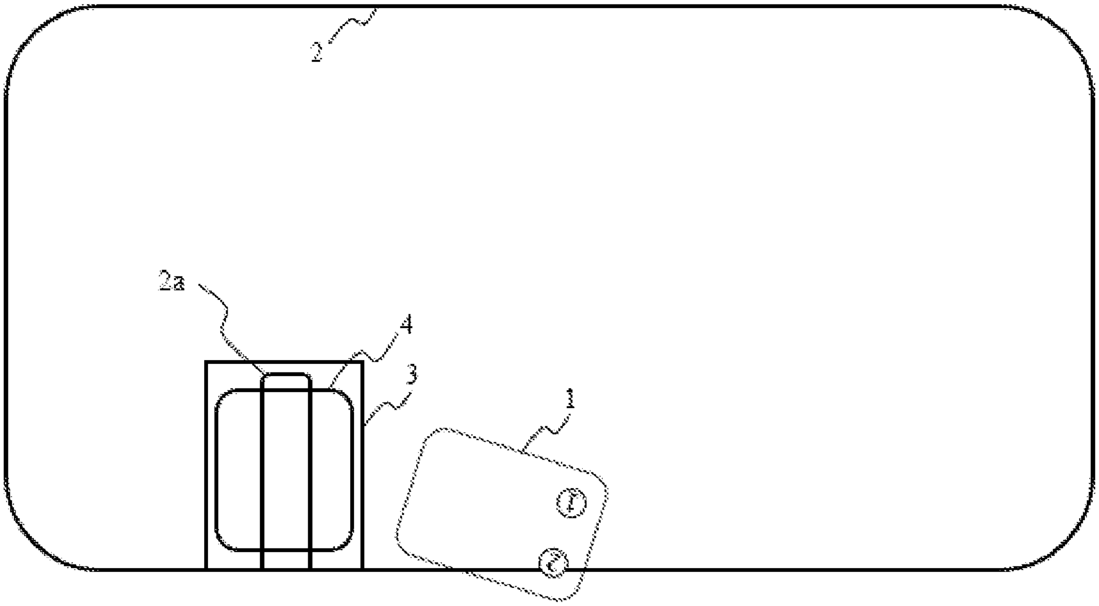
FIG. 11 is a schematic view of a robotic mower rotating to a side away from a charging station according to an embodiment of the disclosure until at least half of the robotic mower is located inside a boundary wire.

S124 is executed that, as shown in FIG. 11, the robotic mower 1 is controlled to rotate to the side away from the charging station 3, and when another sensor 5 (for example, the second sensor in FIG. 11*c*) is detected to cross the boundary wire 2 again, it means that at least half of the robotic mower 1 is located inside the boundary wire 2.

Figure 5:
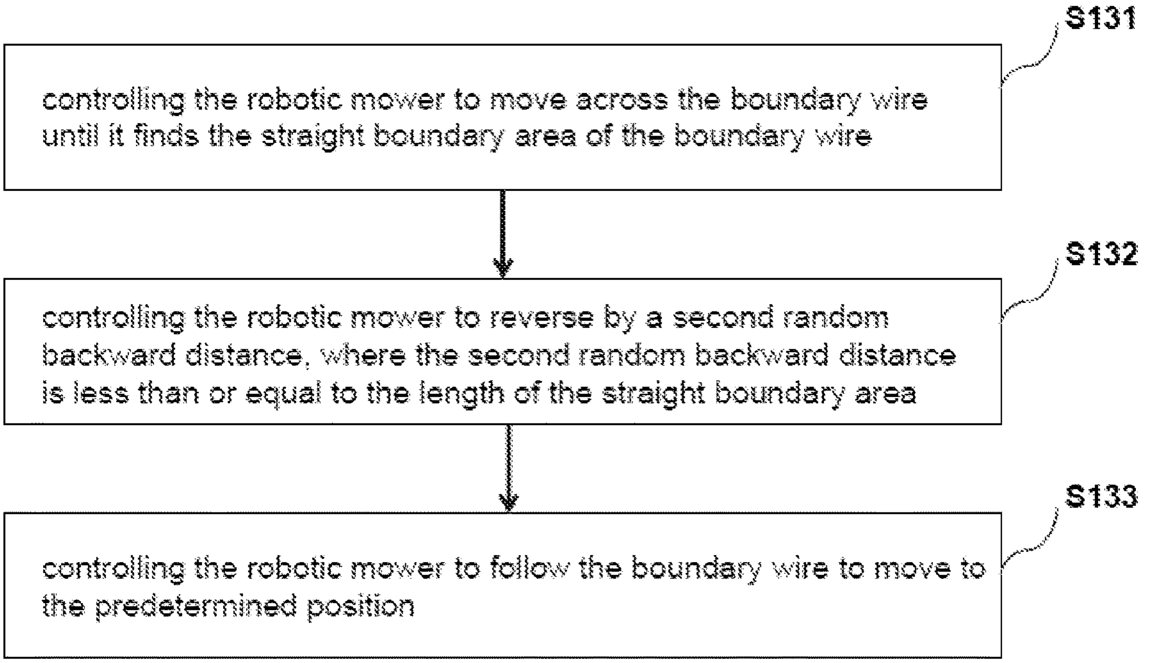
FIG. 5 is a schematic sub-flowchart of S13 in FIG. 3.
Figure 12:
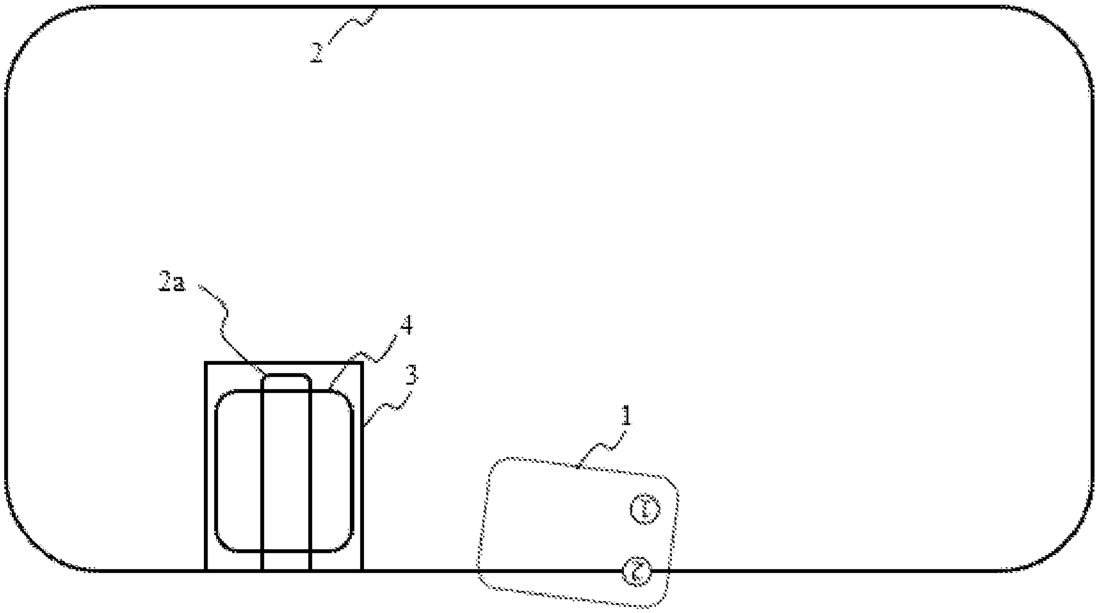
FIG. 12 is a schematic view of a robotic mower riding across a boundary wire according to an embodiment of the disclosure.
Figure 13:
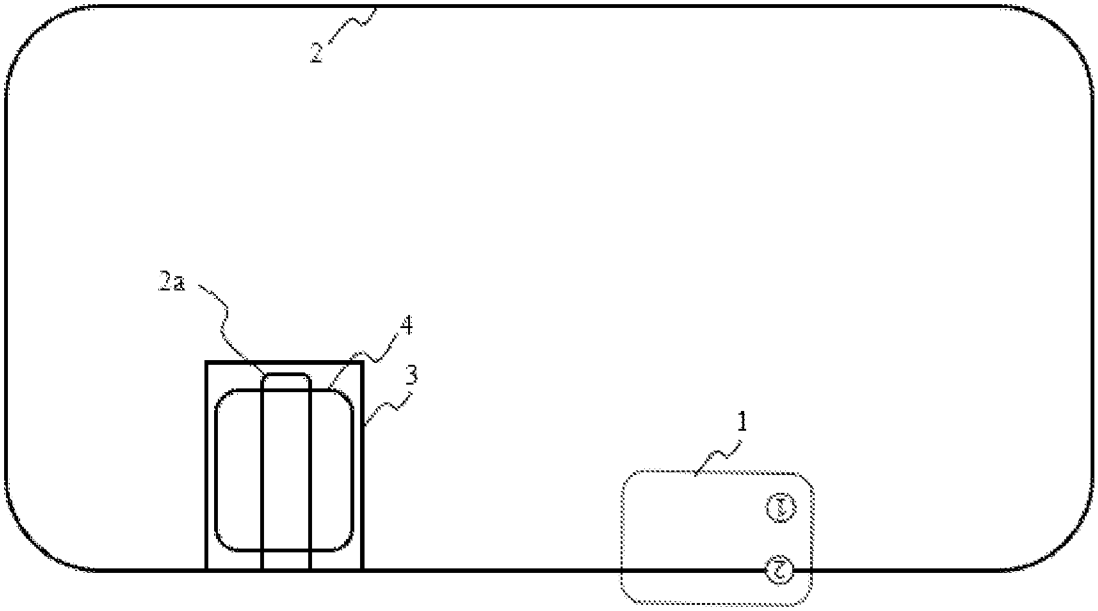
FIG. 13 is a schematic view of a robotic mower having found a straight boundary area of a boundary wire according to an embodiment of the disclosure.
Figure 14:
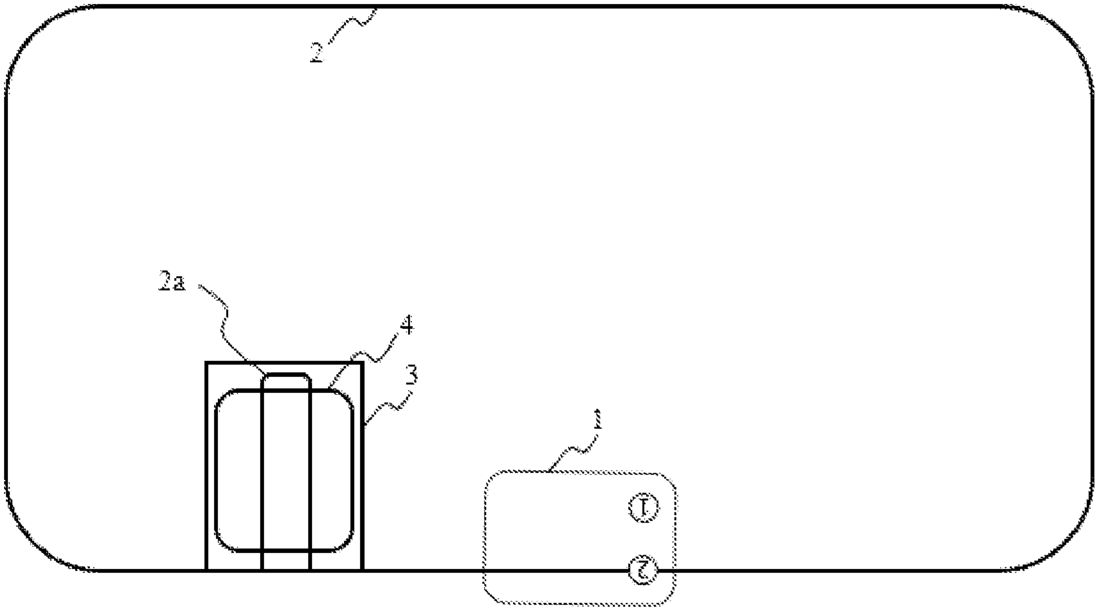
FIG. 14 is a schematic view of the robotic mower after reversing a second random backward distance according to an embodiment of the disclosure.

Then S13 is executed to control the robotic mower 1 to follow the boundary wire 2 until the robotic mower 1 moves to the predetermined position. As shown in FIG. 5, S13 may further include: S131, as shown in FIG. 12 and FIG. 13, the robotic mower 1 moving across the boundary wire 2 until the robotic mower 1 finds the straight boundary area of the boundary wire 2, and the robotic mower 1 will stop moving; S132, as shown in FIG. 14, the robotic mower 1 reversing by a second random backward distance, and the second random backward distance being less than or equal to the length of the straight boundary area; S133, the robotic mower 1 following the boundary wire 2 and moving to the predetermined position.

In S131, as shown in FIG. 12 and FIG. 13, when the robotic mower 1 straddles along the boundary wire 2, the sensor 5 can be used to detect the guiding signal of the boundary wire 2. When the detected guiding single of the sensor 5 remains stable in a certain area of the boundary wire 2 (the polarity and amplitude remain unchanged), it means that the boundary wire 2 is a straight-line. This is because when the boundary wire 2 is not a straight line, since the robotic mower 1 needs to adjust the movement posture frequently during the moving process, the distance between the robotic mower 1 and the boundary wire 2 will fluctuate or even the robotic mower 1 pass through the boundary wire 2, which causes that the induced current signal of sensor 5 will change (in size and/or polarity). In a specific embodiment, when the boundary wire 2 on both sides of the charging station 3 is a straight line, an interval of the boundary wire 2 in which the robotic mower 1 straddles along for a preset time can also be used as the straight boundary area.

Figure 6:
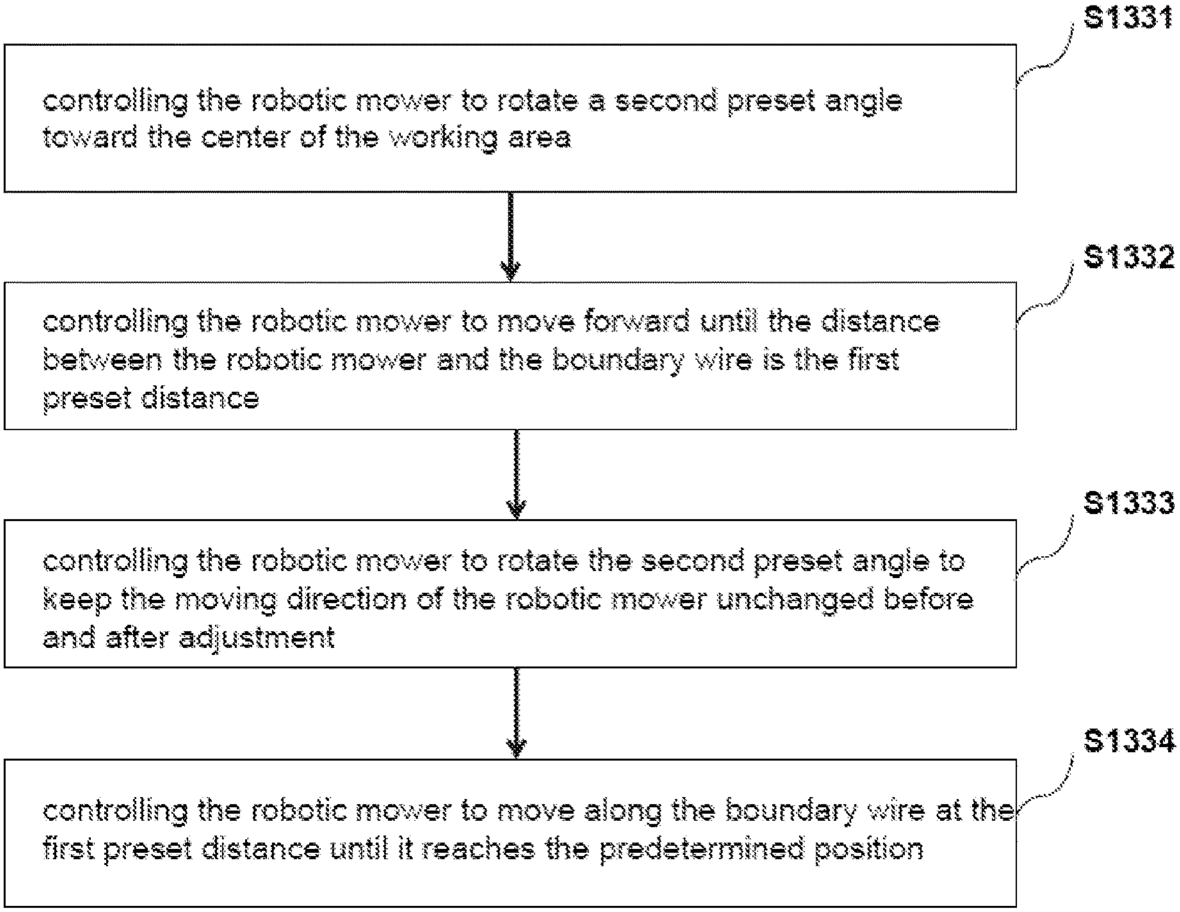
FIG. 6 is a schematic sub-flowchart of S133 in FIG. 5.
Figure 7:
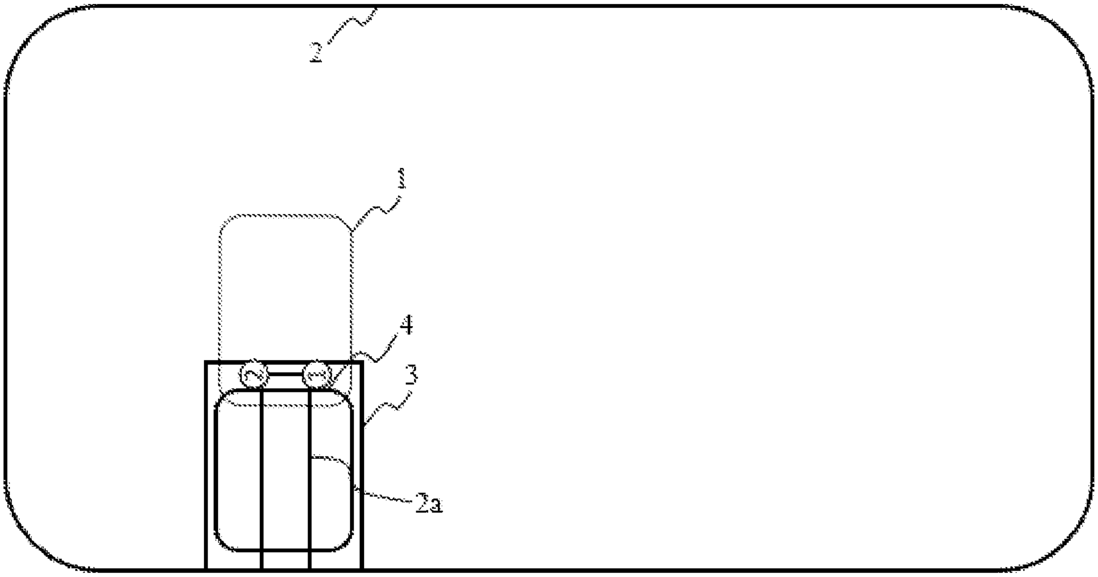
FIG. 7 is a schematic view of a robotic mower exiting to a charging station loop according to an embodiment of the disclosure.
Figure 8:
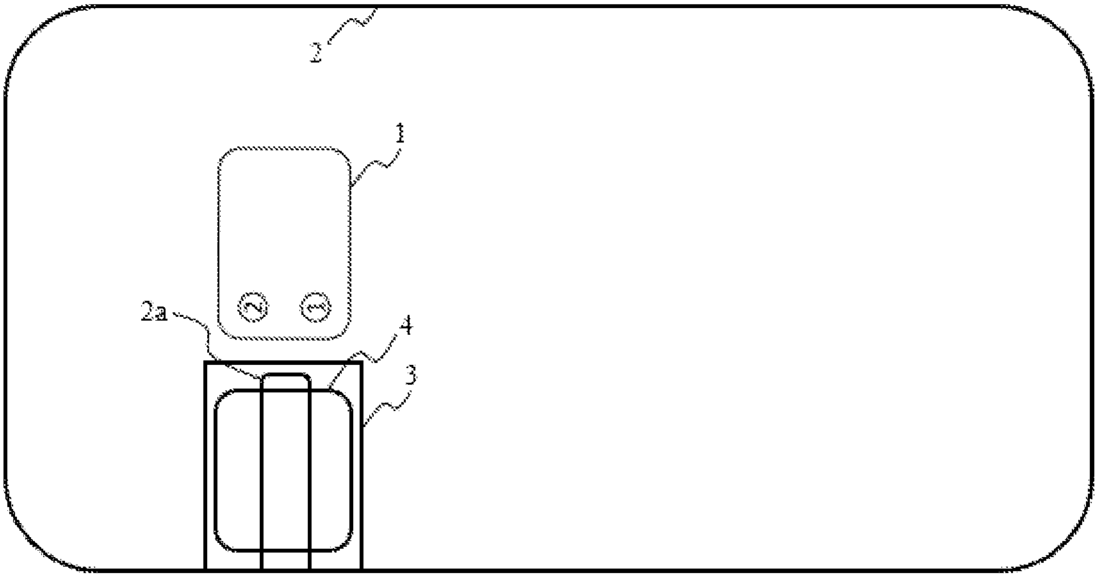
FIG. 8 is a schematic view of a robotic mower continuing to recede in a straight line for a first random backward distance according to an embodiment of the disclosure.
Figure 15A:
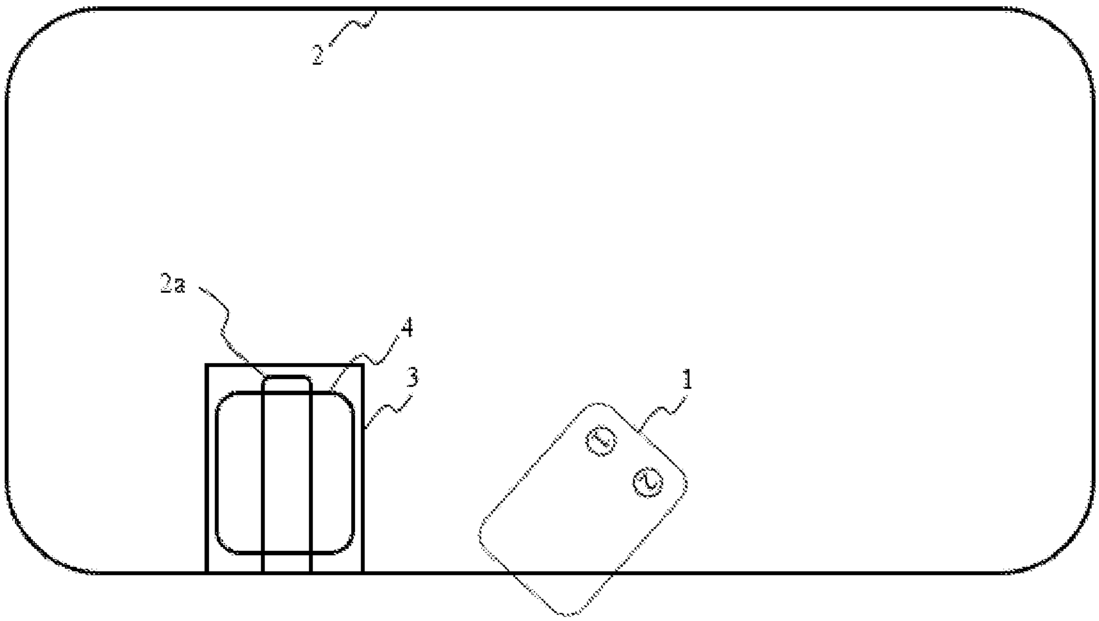
FIGS. 15*a* to 15*c* are schematic views of a robotic mower adjusting a distance between the robotic mower and a boundary wire according to an embodiment of the disclosure.
Figure 15B:
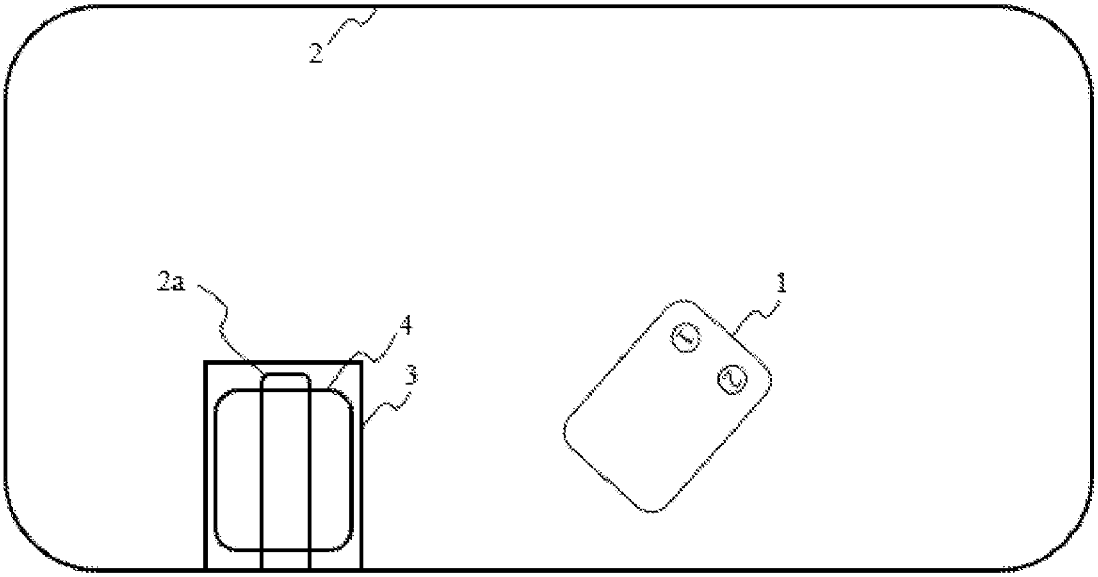
Figure 15C:
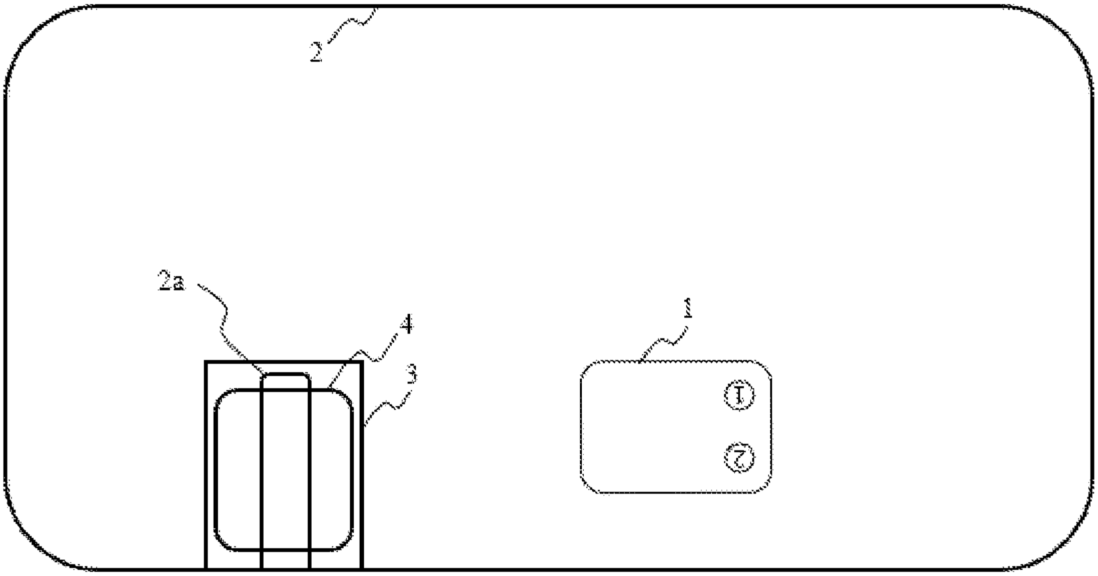
Figure 16A:
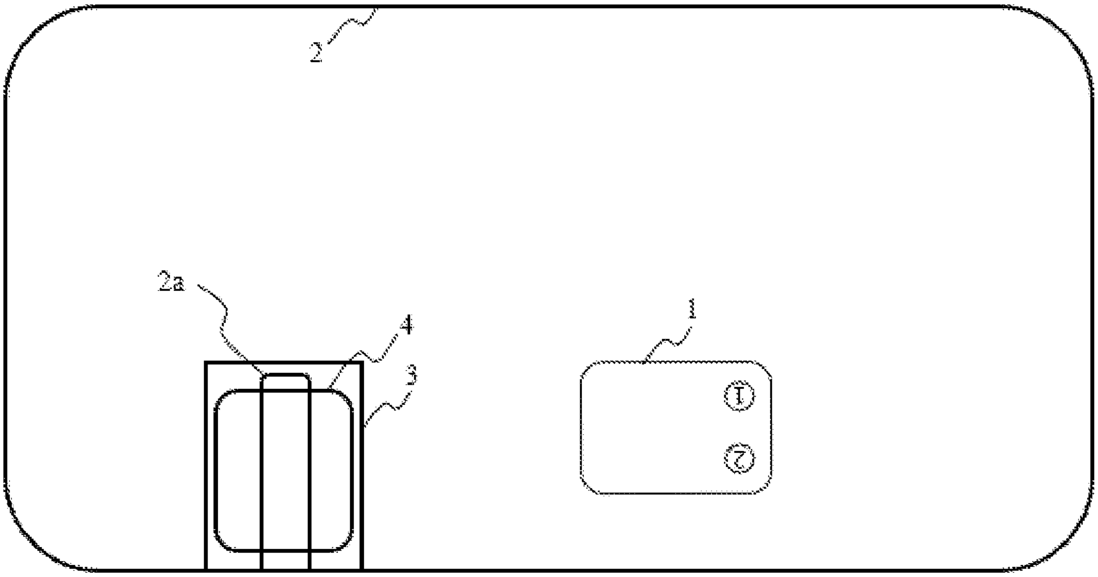
FIGS. 16*a* to 16*d* are schematic views of a robotic mower following a boundary wire to a predetermined position according to an embodiment of the disclosure.
Figure 16B:
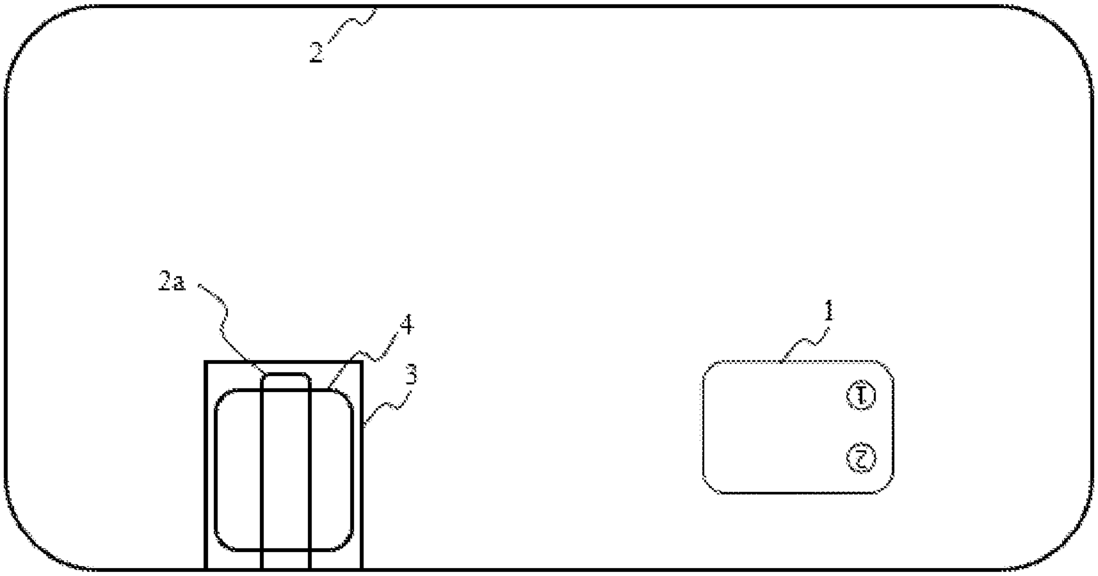
Figure 16C:
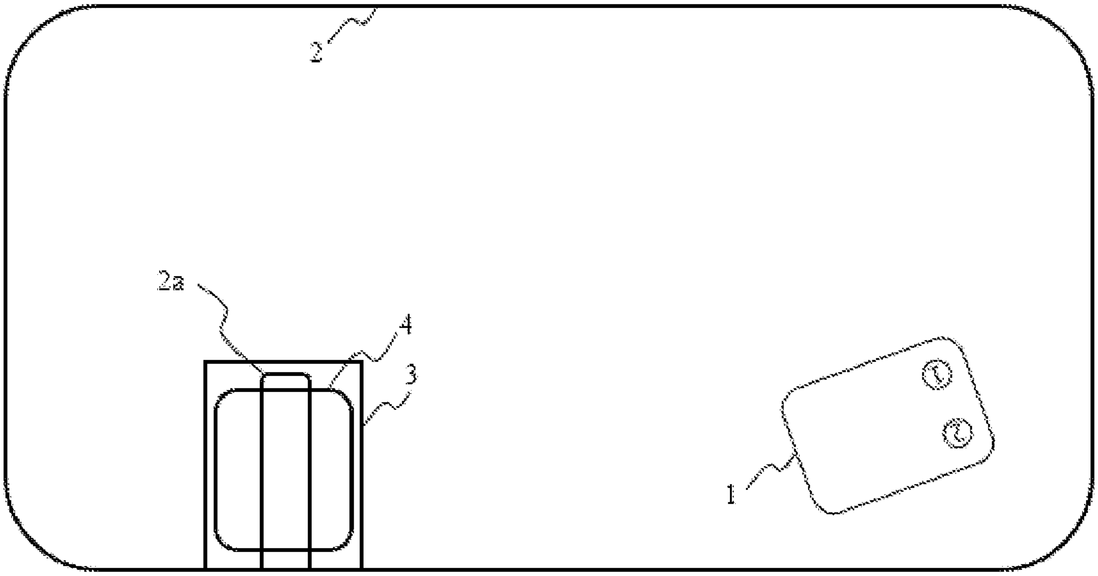
Figure 16D:
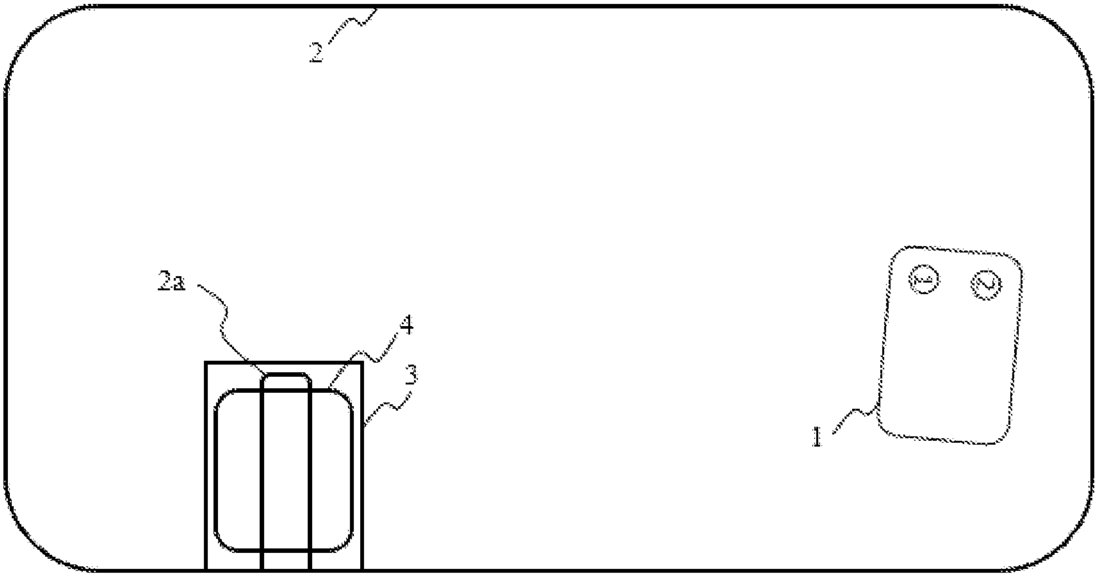

In S133, the predetermined position is a random point away from the boundary wire 2 at a first preset distance, and the first preset distance is a random value, as shown in FIG. 6, the operation of controlling the robotic mower 1 to follow the boundary wire 2 to move towards the predetermined position may further include: first, as shown in FIG. 15*a*, the robotic mower 1 rotating toward the center of the working area at a second preset angle (corresponding to S1331); second, as shown in FIG. 15*b*, the robotic mower 1 moving forward until the distance between the robotic mower 1 and the boundary wire 2 is the first preset distance (corresponding to S1332); third, as shown in FIG. 15*c*, the robotic mower 1 rotating a second preset angle to keep the moving direction of the robotic mower 1 unchanged before and after the adjustment (corresponding to S1333); finally, as shown in FIGS. 16*a* to 16*d* and FIG. 17, the robotic mower 1 moving along the boundary wire 2 at a first preset distance until the robotic mower 1 reaches the predetermined position (corresponding to S1334). Through finding the straight boundary area, reversing back, and adjusting the distance between the robotic mower 1 and the boundary wire 2, it is possible to ensure the robotic mower 1 located in the working area during the process of adjusting the following distance between the robotic mower 1 and the boundary area and prevent the robotic mower 1 from moving outside the working area from being lost. In addition, in this way, the robotic mower 1 can follow the boundary wire 2 along a different path each time, so as to avoid repeated rolling which forms a rut and affects the growth of lawn or vegetation in the rut area.

It should be noted that in S133, the second preset angle is greater than 0° and less than or equal to 90°, and the second preset angle may be a value, such as 30°, 45°, 60°, or 90°. When the second preset angle is 90°, in S1332, the forward distance of the robotic mower 1 is set as the first preset distance. When the second preset angle is greater than 0° and less than 90°, in S1332, the forward distance of the robotic mower 1 is less than or equal to the value of which the first preset distance divided by the cosine value of the second preset angle, the value of the first preset distance is equal to the product of the forward distance of the robotic mower 1 in S1332 and the sine value of the second preset angle.

In S1334, the robotic mower 1 first uses a sensor 5 to sample the guiding signal of the boundary wire 2 to obtain the induced current signal. And the robotic mower 1 is controlled to follow the boundary wire 2 with the amplitude of the induced current signal at that moment in order to ensure that the distance between the robotic mower 1 and the boundary wire 2 is maintained at the first preset distance during the following process of the robotic mower 1.

Figure 17:
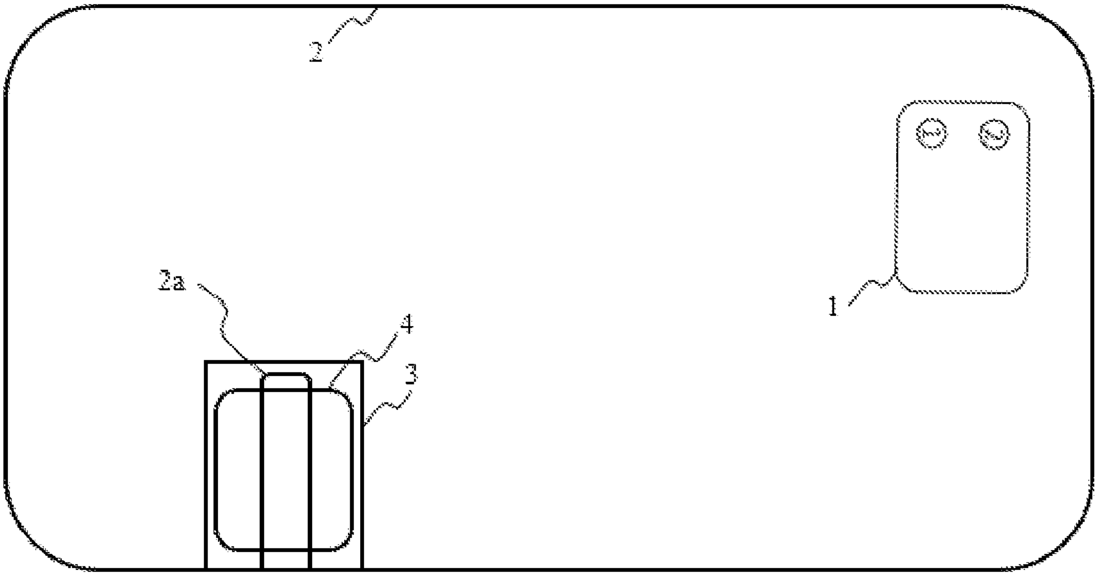
FIG. 17 is a schematic view of a robotic mower after reaching a predetermined position according to an embodiment of the disclosure.
Figure 18:
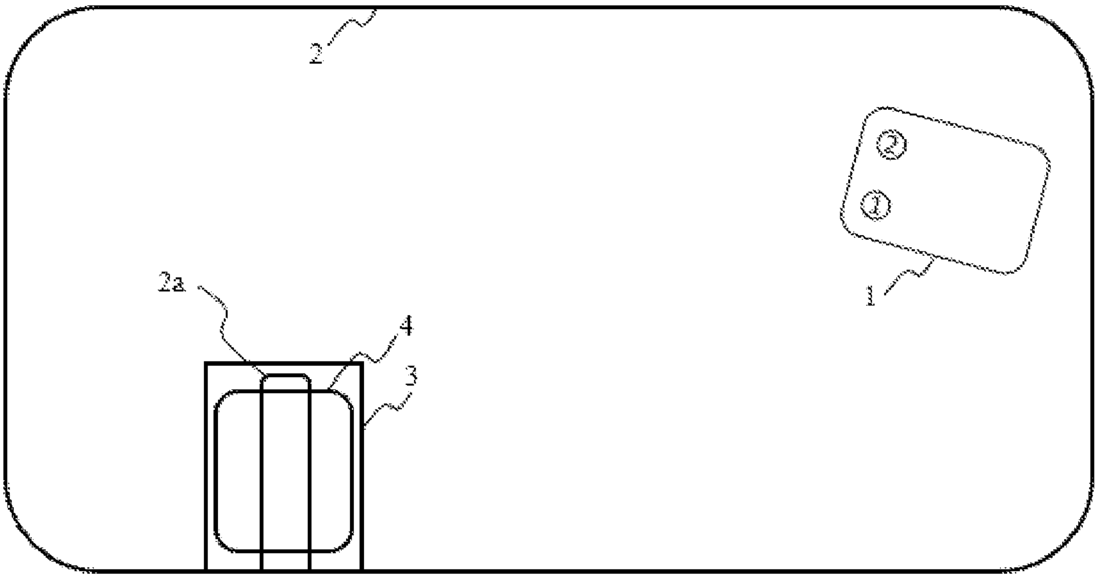
FIG. 18 is a schematic view of a random mowing operation after a robotic mower reaches a predetermined position according to an embodiment of the disclosure.
Figure 19:
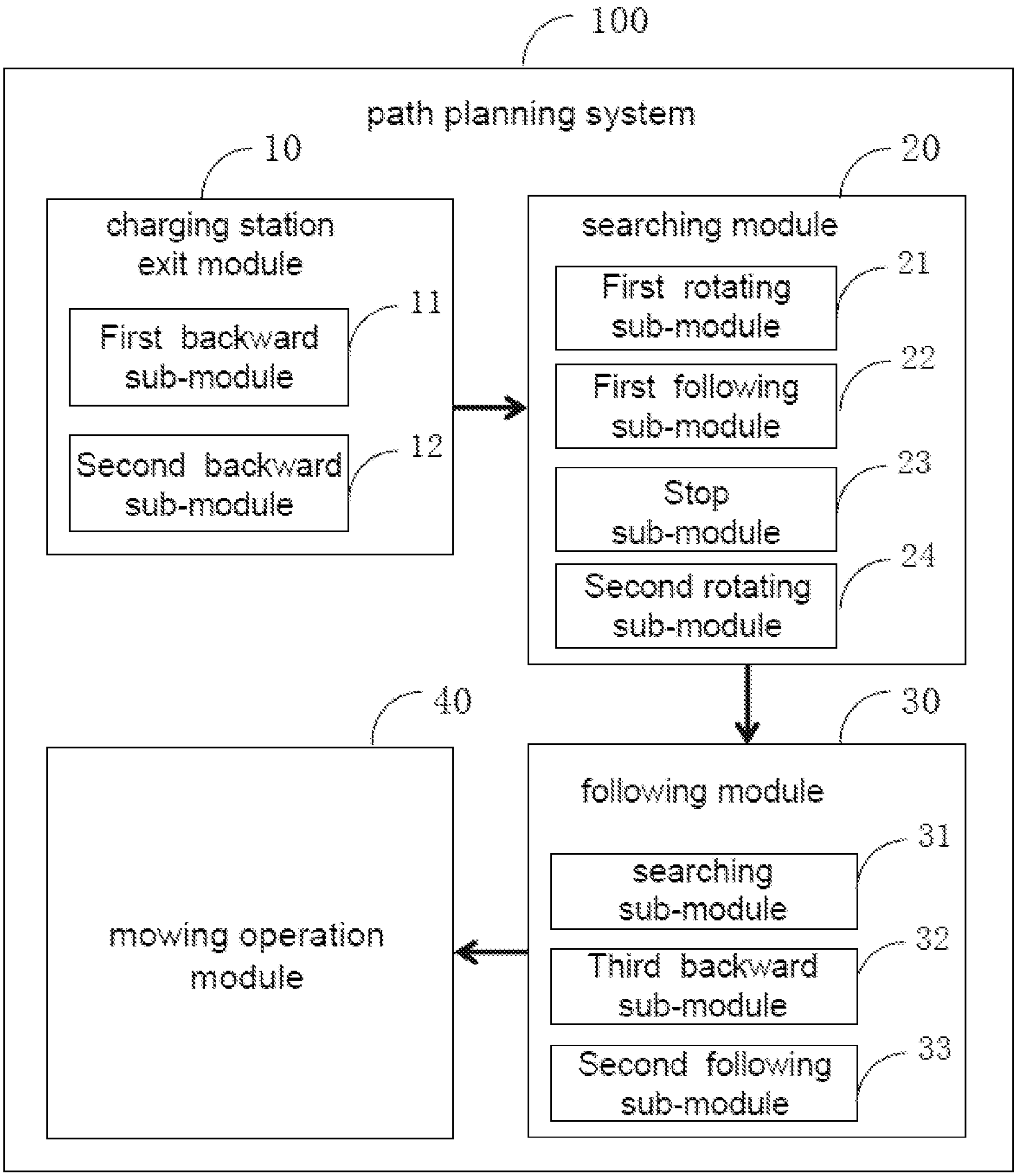
FIG. 19 is a schematic block view of a path planning system of a robotic mower according to an embodiment of the disclosure.

Finally, S14 is executed as shown in FIG. 17 and FIG. 18. When it is detected that the total moving distance of the robotic mower 1 is the same as the set value, it means that the robotic mower 1 has reached the predetermined position, and the robotic mower stops moving along the boundary wire 2. The robotic mower 1 randomly rotates an angle and then starts mowing within the working area defined by the boundary wire 2. As an example, the robotic mower 1 can mow in a random manner in the working area. When cutting grass randomly, the robotic mower 1 can rotate 360° randomly. When the robotic mower 1 randomly rotates in a random direction to mow forward, the robotic mower 1 will walk in a straight line until the robotic mower 1 reaches the boundary wire 2 (the polarity of the induced current generated by the sensor 5 in response to the guiding signal of the boundary wire 2 can be used to determine whether the robotic mower 1 crosses the boundary wire 2). When the robotic mower 1 reaches the boundary wire 2, the automatic lawn mower 1 will randomly rotate an angle inward to mow.

It should be noted that the division of operations in the various methods above is just for clarity of description. When implemented, it can be combined into one operation or some operations can be split into multiple operations. As long as they contain the same logical relationship, they are all within the scope of the disclosure. Adding insignificant modifications to the algorithm or process or introducing insignificant design, but not changing the core design of the algorithm and process are within the scope of the disclosure.

As shown in FIG. 19, the embodiment of this disclosure also introduces a path planning system of a robotic mower for realizing the path planning method of the robotic mower. The path planning system of the robotic mower includes a charging station exit module 10, a searching module 20 (as a boundary searching module), a following module 30 (a boundary following module), and a mowing operation module 40. The charging station exit module 10 is used to control the robotic mower 1 to exit a charging station 3. The searching module 20 is used to control the robotic mower 1 to find a boundary wire 2, wherein the boundary wire 2 is pre-laid on the edge of the working area of the robotic mower 1. The following module 30 is used to control the robotic mower 1 to follow the boundary wire 2 until the robotic mower reaches the predetermined position. The mowing operation module 40 is used to control the robotic mower 1 to start mowing in the working area after reaching the predetermined position.

As shown in FIG. 19, the charging station exit module 10 further includes a first backward sub-module 11 and a second backward sub-module 12. The first backward sub-module 11 is used to control the robotic mower 1 to exit the charging station 3 after the charging is completed. The second backward sub-module 12 is used to control the robotic mower 1 to continue to reverse in a straight line for a first random backward distance when the robotic mower 1 exits the charging station loop 4.

Please refer to FIG. 19, the searching module 20 includes a first rotating sub-module 21, a first following sub-module 22, a stop sub-module 23, and a second rotating sub-module 24. The first rotating sub-module 21 is used to control the robotic mower 1 to rotate to any side of the charging station 3 at a first preset angle. The first following sub-module 22 is used to control the robotic mower 1 to follow a guidance of the charging station loop 4 set in the charging station 3 to move to the boundary wire 2. The stop sub-module 23 is used to control the robotic mower 1 to stop moving when part of the robotic mower 1 is located outside the boundary wire 2. The second rotating sub-module 24 is used to control the robotic mower 1 to rotate to a side away from the charging station 3 until at least half of the robotic mower 1 is inside of the boundary wire 2.

Please refer to FIG. 19, the following module 30 further includes a searching sub-module 31, a third backward sub-module 32 and a second following sub-module 33. The searching sub-module 31 is used to control the robotic mower 1 to straddle along the boundary wire 2 until the robotic mower finds the straight boundary area of the boundary wire 2. The third backward sub-module 32 is used to control the robotic mower 1 to reverse in a second random backward distance, and the second random backward distance is less than or equal to a length of the straight boundary area. The second following sub-module 32 is used to control the robotic mower 1 to follow the boundary wire 2 to move toward the predetermined position.

Figure 20:
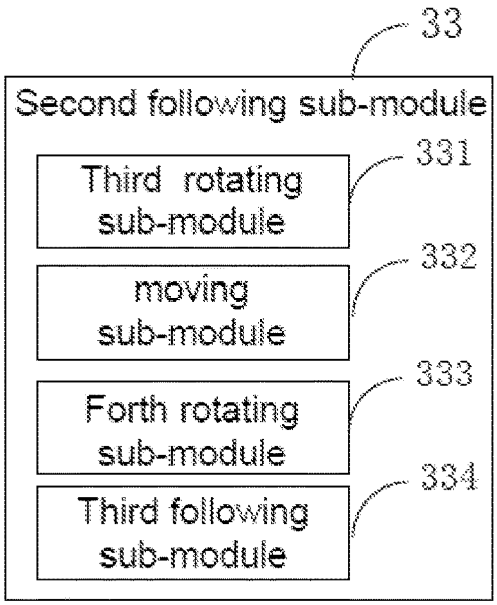
FIG. 20 is a schematic structural block view of a second following sub-module according to an embodiment of the disclosure.
Figure 21:
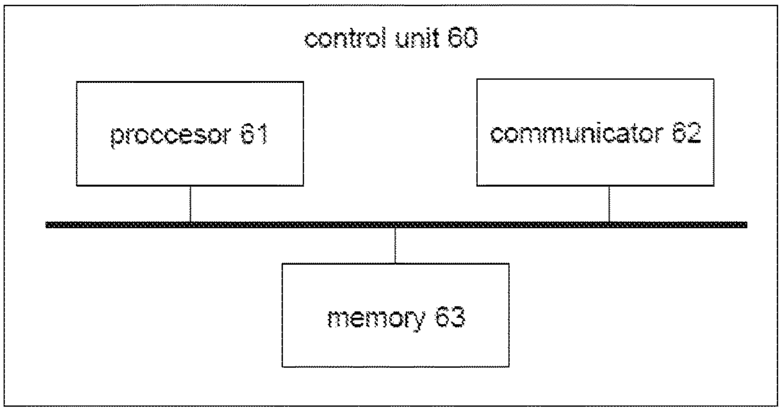
FIG. 21 is a schematic structural block view of a control unit according to an embodiment of the disclosure.

Please refer to FIG. 20, the second following sub-module 33 further includes a third rotating sub-module 331, a moving sub-module 332, a fourth rotating sub-module 333, and a third following sub-module 334. The third rotating sub-module 331 is used to control the robotic mower 1 to rotate toward a center of the working area at a second preset angle. The moving sub-module 332 is used to control the robotic mower 1 to move forward until a distance between the robotic mower 1 and the boundary wire 2 is a first preset distance. The fourth rotating sub-module 333 is used to control the robotic mower 1 to rotate at a second preset angle so as to keep the moving direction of the robotic mower 1 unchanged before and after adjustment. The third following sub-module 334 is used to control the robotic mower 1 to follow the boundary wire 2 to move at the first preset distance until the robotic mower reaches the predetermined position.

It should be noted that the path planning system of the robotic mower of this embodiment is a system corresponding to the path planning method of the robotic mower mentioned above. And the functional modules or functional sub-modules in the path planning system of the robotic mower correspond to the operations in the path planning method of the robotic mower. The path planning system of the robotic mower of this embodiment can be implemented in cooperation with the path planning method of the robotic mower. The relevant technical details mentioned in the path planning method of the robotic mower of this embodiment are still valid in the path planning system of the robotic mower. In order to reduce repetition, it will not be repeated here. Correspondingly, the relevant technical details mentioned in the path planning system of the robotic mower of this embodiment can also be applied to the path planning method of the robotic mower mentioned above.

In the implementation process, each operation of the method and the modules mentioned above can be completed by an integrated logic circuit of hardware in an element of the processor 61 or instructions in the form of software.

It should be noted that, as shown in FIG. 20, the path planning method of the robotic mower of this embodiment can also be implemented by a control unit 60 arranged on the body of the robotic mower 1. The control unit 60 includes a memory 63 and a processor 61 that are connected to each other. The memory 63 stores program instructions. When the program instructions are executed by the processor 61, the path planning method of the robotic mower mentioned above can be implemented. It should be noted that, when it is necessary to communicate with the outside world, the control unit 60 further includes a communicator 62, and the communicator 62 is connected to the processor 61.

It should be noted that the memory 63 in the control unit 60 mentioned above can be implemented in the form of a software functional unit and can be sold or used as an independent product, the memory 63 can be stored in a computer-readable storage medium. Based on this understanding, the technical solution of this embodiment essentially or the part that contributes to the conventional art or the part of the technical solution can be embodied in the form of a software product; and the computer software product is stored in a storage medium, including several instructions which can be used to make a computer (which may be a personal computer, an electronic device, or a network device, etc.) execute all or part of the operations of this embodiment.

This embodiment may also provide a storage medium that stores a program, and when the program is executed by the processor 61, the path planning method for a robotic mower mentioned above is implemented. The storage media includes all forms of non-volatile memory, media and memory devices, including, for example: semiconductor memory devices, such as EPROM, EEPROM, or flash memory devices; magnetic disks, such as internal hard disks or removable disks; magneto-optical disks; and CD-ROM and DVD-ROM disks.

In summary, the robotic mower and its path planning method, system and device of this embodiment can be used to plan the path for the robotic mower to leave the charging station, so that the robotic mower leaves the charging station along a different path each time, in order to avoid rutting when the robotic mower exits the station along a fixed path which affects the growth of lawn or vegetation in the rutting area. The robotic mower and its path planning method, system and device of this embodiment can be used to plan the path for the robotic mower to leave the charging station, so that the robotic mower leaves the charging station along a different path each time, so that repeatedly mowing along the same path can be prevented, and the mowing efficiency and the beauty of the lawn can be improved.

The Second Embodiment

Figure 22:
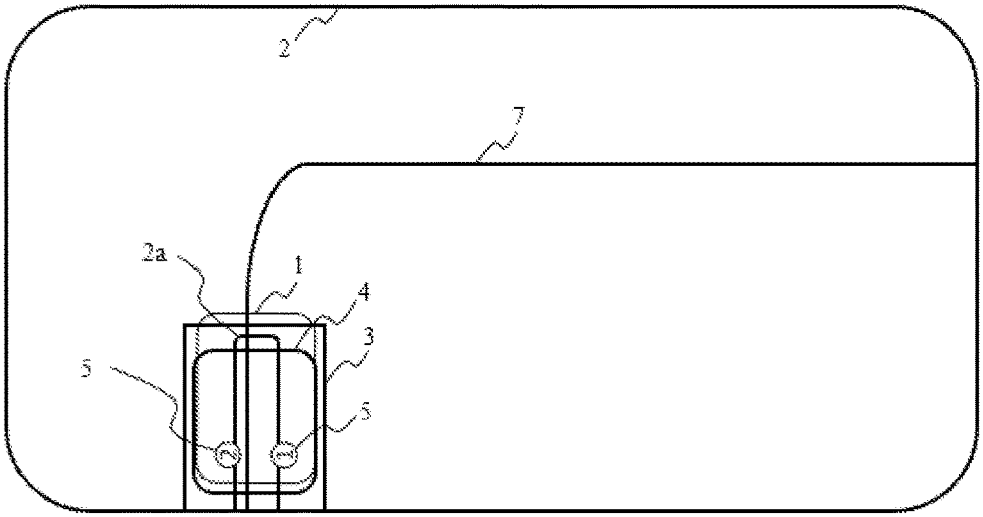
FIG. 22 is a schematic structural view of a path planning device for a robotic mower moving out from a charging station according to another embodiment of the disclosure.
Figure 23:
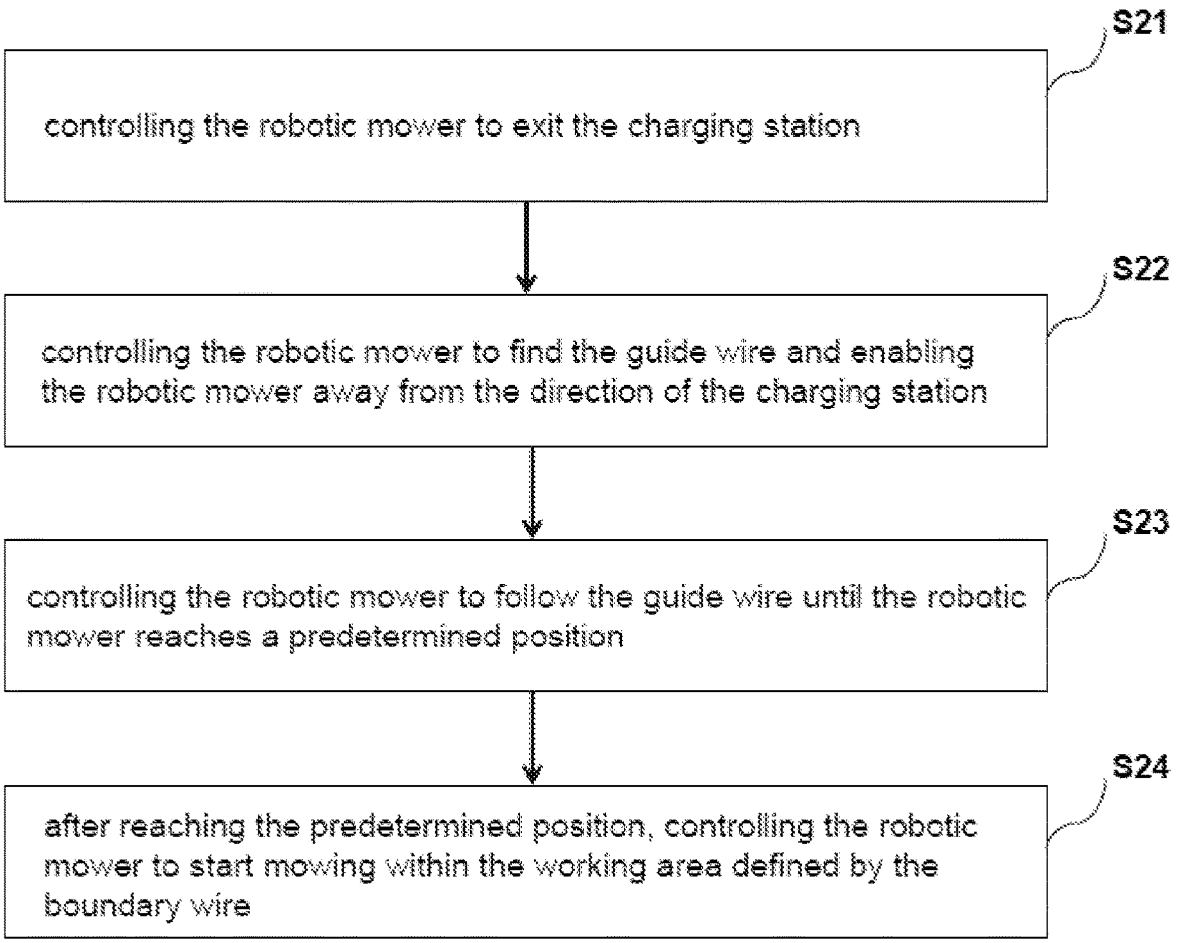
FIG. 23 is a schematic flow chart of a path planning method for a robotic mower according to another embodiment of the disclosure.

Electric-driven automatic mowers need to often return to the charging station for charging. When they leave the charging station and return to the mowing area after being charged, in order to prevent the robotic mower from leaving the station along a fixed path, it is prone to rutting, and causes more mowing on the same path. This embodiment discloses another method, system and device for path planning of a robotic mower for the robotic mower to leave the charging station. Wherein, FIG. 2 shows a block view of the robotic mower of this embodiment, and FIG. 22 shows a schematic structural view of the path planning device of the robotic mower of this embodiment. FIG. 23 shows a schematic flow chart of the path planning method of the robotic mower of this embodiment. FIG. 33 shows a block view of the path planning system of the robotic mower of this embodiment. It should be noted that, in order to make the drawings clearer, the robotic mower and the charging station are enlarged and shown in FIG. 22 and FIG. 26 to FIG. 32. In this embodiment, the robotic mower includes a self-propelled automatic mower, which is a battery-powered electric tool that needs to be charged regularly. The robotic mower can move within the working area defined by the boundary wire when used.

Please refer to FIG. 2 and FIG. 22, similar to the first embodiment, the path planning device of the robotic mower is used for the robotic mower 1 exiting the station in this embodiment, the path planning device includes a robotic mower 1, a guide wire 7, a boundary wire 2, an obstacle avoidance sensor 50 and a charging station 3. The robotic mower 1 includes a body, a control unit 60 arranged on the body and at least one sensor 5. The sensor 5 is arranged at the front end of the body, and the sensor 5 is used to detect the guiding signal of at least one of the boundary wire 2, the guide wire, and the charging station loop 4. The control unit 60 is used for controlling the robotic mower 1 to automatically leave the charging station 3 according to the guiding signal. For detailed description of the robotic mower 1, the boundary wire 2, the obstacle avoidance sensor 50, and the charging station 3, please refer to the first embodiment, which will not be repeated here.

In this embodiment, the guiding signal of the boundary wire 2, the guide wire 7 or the charging station loop 4, the sensor 5, and the functioning modes of the guiding signal and the sensor 5 are the same as in the first embodiment, so they will not be repeated here. The following will take the sensor 5 as a magnetic induction coil and the guiding signal generated by the boundary wire 2, the guide wire 7 or the charging station loop 4 as an alternating magnetic field as an example to illustrate the technical solution of this embodiment.

FIG. 23 shows the path planning method of the robotic mower for the robotic mower 1 leaving the charging station 3 of this embodiment, and the guiding signals of the boundary wire 2 and the charging station loop 4 are detected by two magnetic induction coils arranged at the front end of the robotic mower 1 to realize that the robotic mower 1 can leave the charging station 3. The two magnetic induction coils are respectively set on both sides of the center line of the front end of the robotic mower 1, which is defined as a first sensor (represented by ① in FIG. 22 and FIG. 26 to FIG. 32) and a second sensor (represented by ② in FIG. 1 and FIG. 26-FIG. 32). The first sensor and the second sensor can be arranged in a symmetric manner or in an asymmetric manner. The path planning method of the robotic mower includes the following operations: S21, controlling the robotic mower 1 to exit the charging station 3; S22, controlling the robotic mower 1 to find the guide wire 7 and enabling the robotic mower 1 away from the direction of the charging station 3, wherein the guide wire 7 is pre-laid in the working area of the robotic mower; S23: controlling the robotic mower 1 to follow the guide wire 7 until the robotic mower 1 reaches a predetermined position; S24, after reaching the predetermined position, controlling the robotic mower 1 to start mowing within the working area defined by the boundary wire 2. FIG. 26 to FIG. 32 respectively correspond to the schematic views of the positions and orientations of the robotic mower 1 in the working area in different operations of the path planning method of the robotic mower. The path planning method of the robotic mower of this embodiment will be described below with reference to FIG. 6 to FIG. 32.

First, S21 is executed to control the robotic mower 1 to exit the charging station 3 according to the guiding signal of the charging station loop 4 detected by the sensor 5. After the robotic mower 1 is fully charged, the robotic mower 1 needs to exit the charging station 3 and keep a certain distance from the charging station 3. Specifically, as shown in FIG. 22, when the charging is completed, the robotic mower 1 starts to exit the charging station 3. When the sensor 5 detects that the polarity of the guiding signal of the charging station loop 4 is reversed (the polarity of the induced current of the sensor 5 is reversed), it means that the robotic mower 1 exits outside to the charging station loop 4 (please refer to FIG. 26). Then the robotic mower 1 continues to go backwards in a straight line for a random backward distance and then stops moving (please refer to FIG. 27). Since the robotic mower 1 goes backwards at a random distance, this can ensure that the robotic mower 1 will not follow a same direction when looking for the guide wire 7 and making the robotic mower 1 away from the direction of the charging station 3 (which is S22). It can avoid rutting, which will damage the grass or vegetation in the working area.

Figure 24:
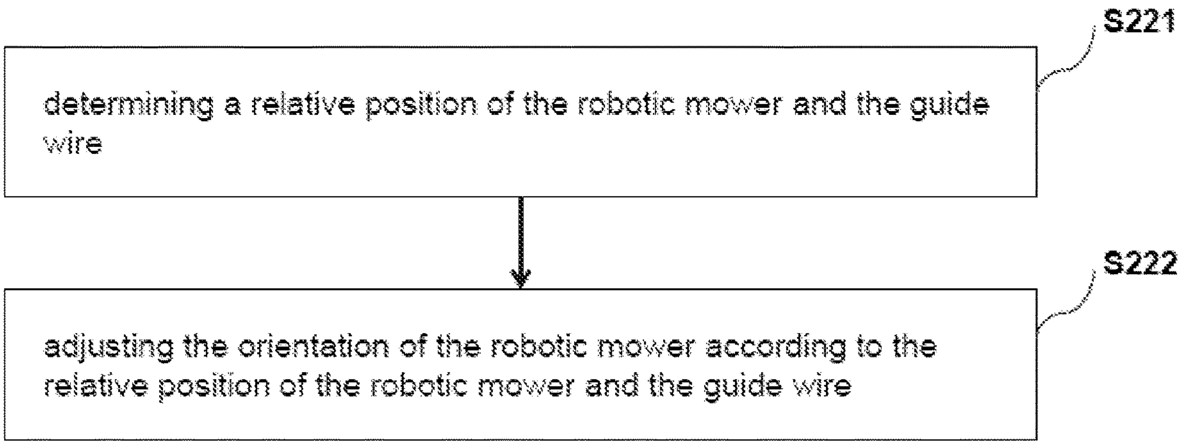
FIG. 24 is a schematic sub-flowchart of S22 in FIG. 23.
Figure 27:
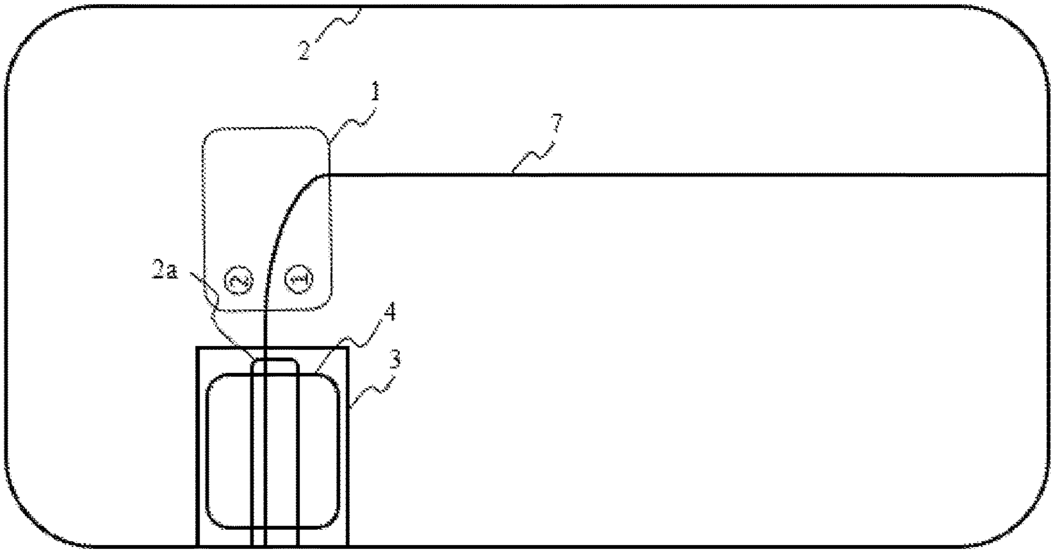
FIG. 27 is a schematic view of a robotic mower continuing to retreat in a straight line for a random backward distance according to another embodiment of the disclosure.
Figure 28A:
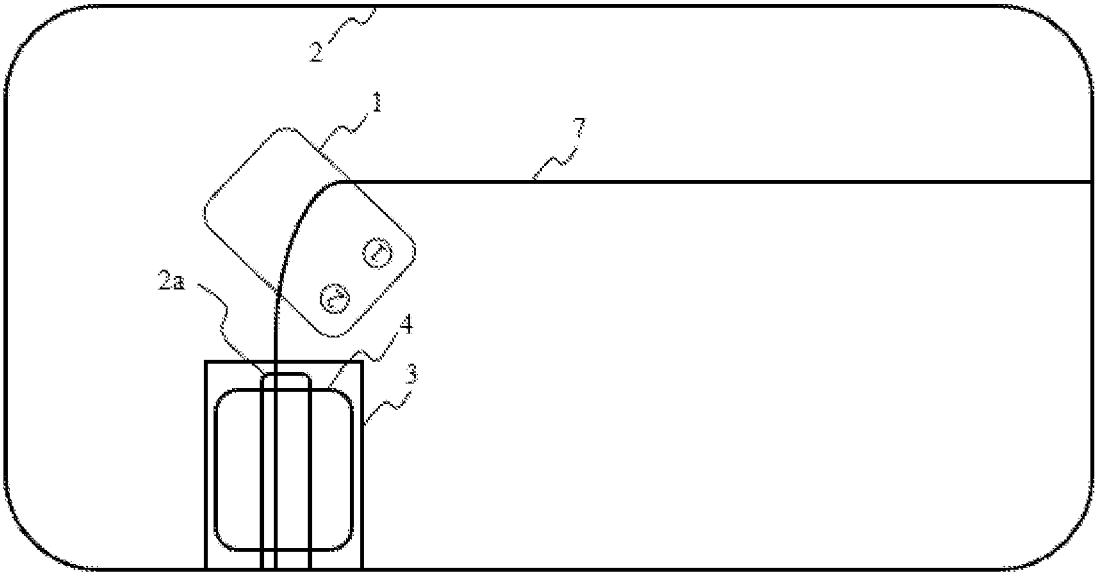
FIGS. 28*a* to 28*c* are schematic views of a robotic mower looking for a guide wire and making the robotic mower face a direction away from a charging station according to another embodiment of the disclosure.
Figure 28B:
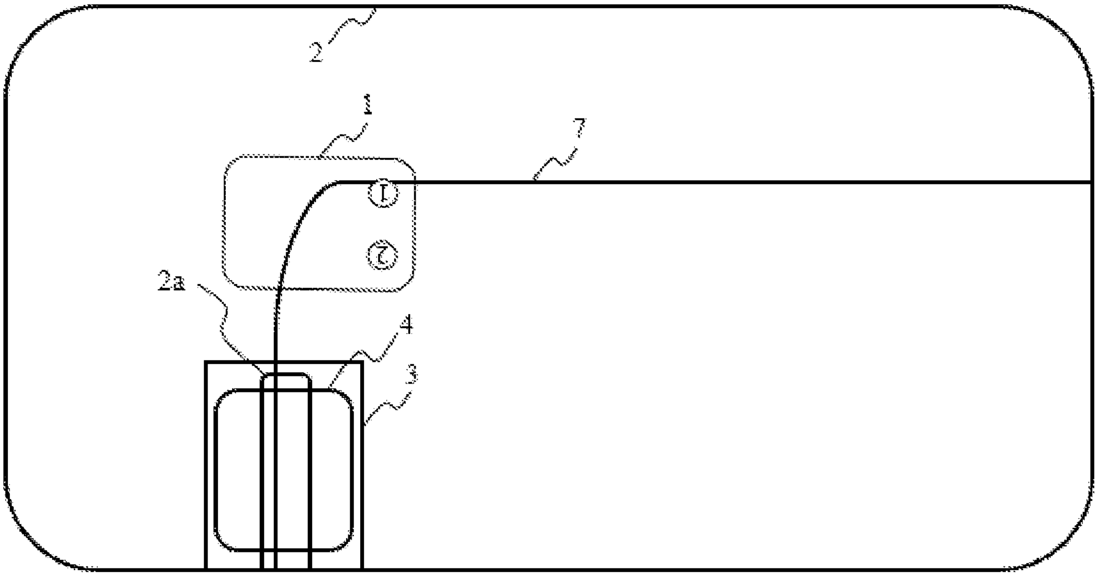
Figure 28C:
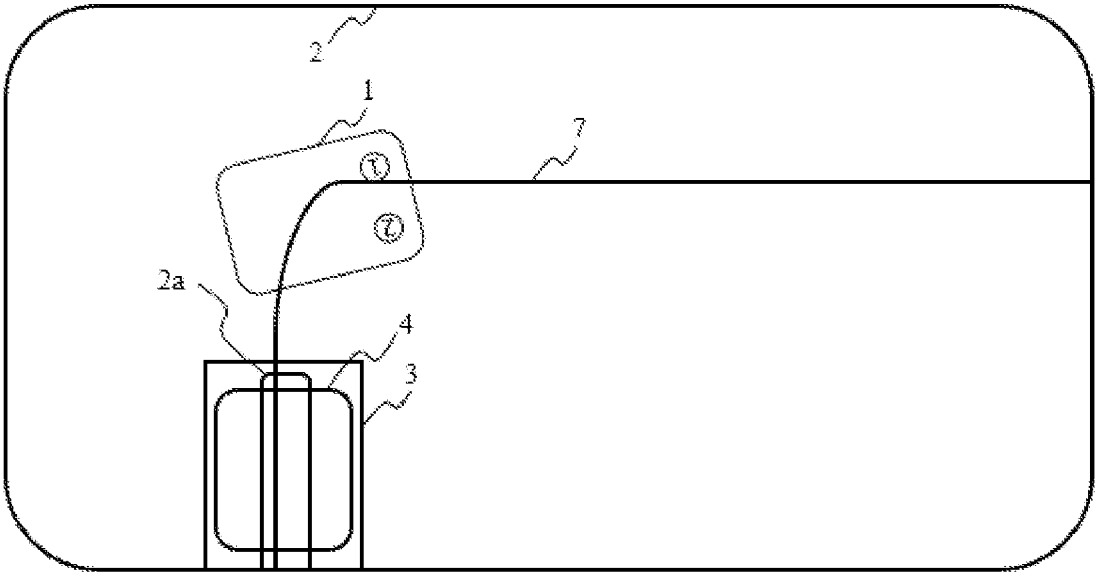

Then, S22 is executed to control the robotic mower 1 to find the guide wire 7 and to make the robotic mower 1 face away from the charging station 3. As shown in FIG. 24, S22 may further include: S221, as shown in FIG. 27, determining a relative position of the robotic mower 1 and the guide wire 7, for example, the polarity of the induced current of the two sensors 5 (of course a single sensor 5 can also be used) can be used to determine the position of the guide wire 7 relative to the robotic mower 1; S222, as shown in FIG. 28*a* to FIG. 28*c*, adjusting the orientation of the robotic mower 1 according to the relative position of the robotic mower 1 and the guide wire 7, so that the robotic mower 1 can face away from the charging station 3, and after the direction of the robotic mower 1 adjusted, the robotic mower 1 starts to measure the moving distance to determine the predetermined position mentioned above in S23. As an example, FIG. 27 shows that the two sensors 5 are located on both sides of the guide wire 7. In this case, the robotic mower 1 faces the charging station 3. Therefore, for example, it can rotate with the method shown in FIG. 28*a* to FIG. 28*c* (of course, the opposite rotation method can also be used), until when the two sensors 5 are located on both sides of the guide wire 7 again, it means that the robotic mower 1 is facing away from the direction of charging station 3. It should be noted that, according to the relative position of the guide wire 7 and the robotic mower 1, and the different rotation direction of the robotic mower 1, the orientation adjustment method of the robotic mower 1 is also different.

Figure 25:
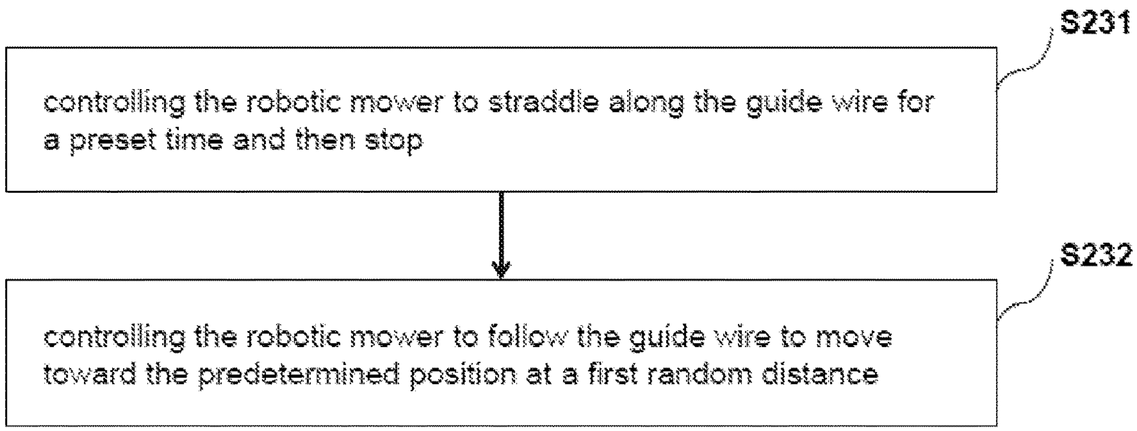
FIG. 25 is a schematic sub-flowchart of S23 in FIG. 23.
Figure 26:
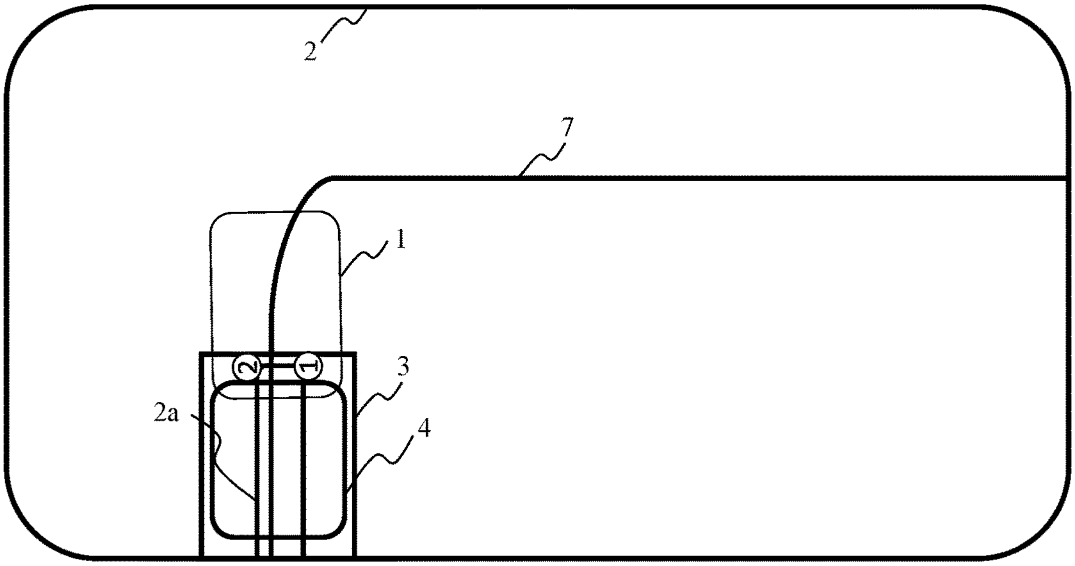
FIG. 26 is a schematic view of a robotic mower exiting to the charging station loop according to another embodiment of the disclosure.
Figure 29:
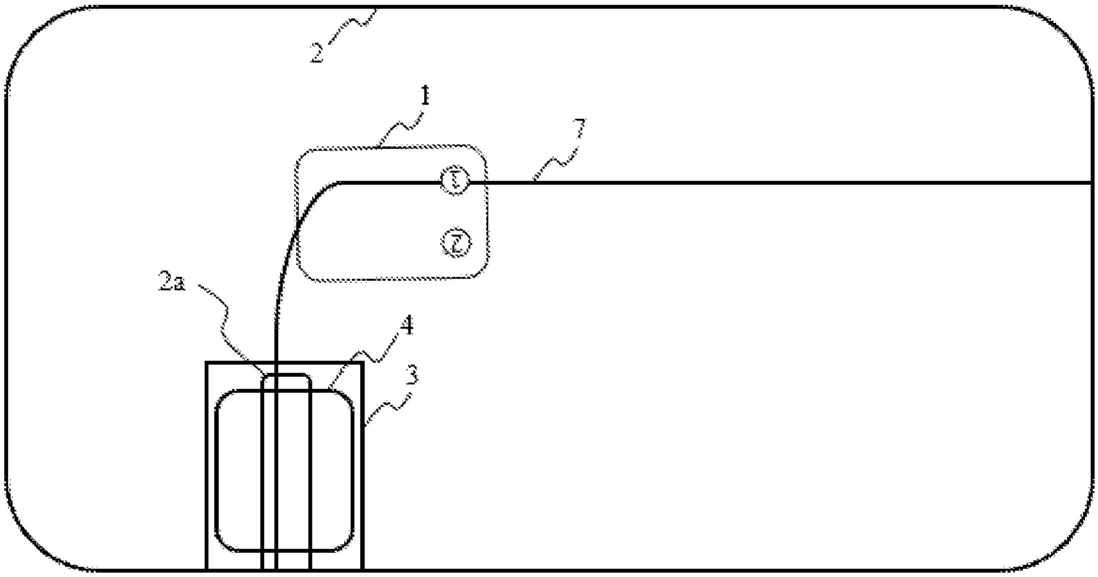
FIG. 29 is a schematic view of a robotic mower riding across a guide wire according to another embodiment of the disclosure.
Figure 30:
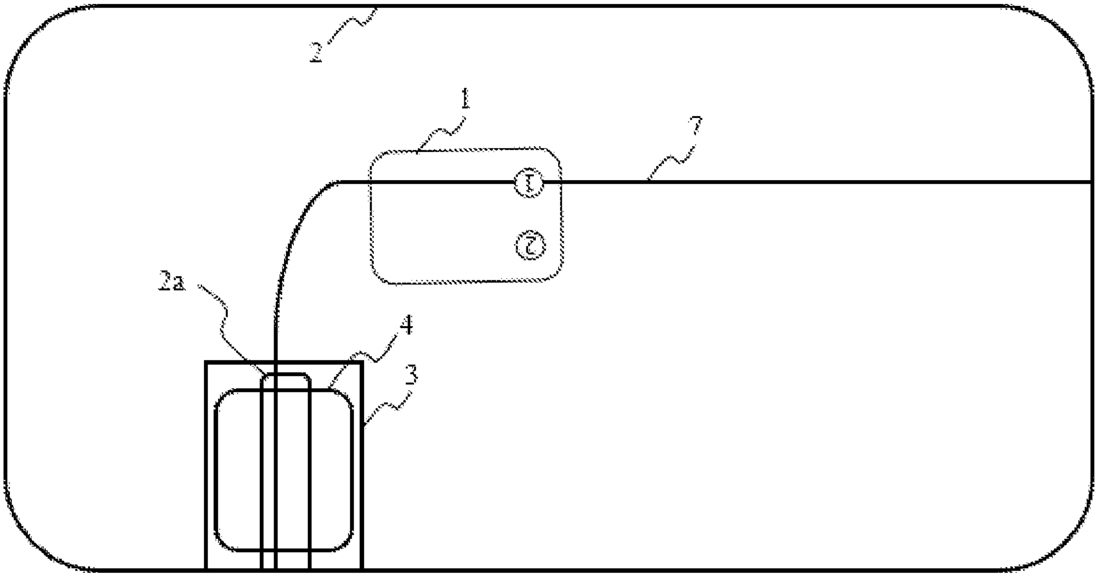
FIG. 30 is a schematic view of a robotic mower riding across a guide wire after moving for a preset time according to another embodiment of the disclosure.

Next, S23 is executed to control the robotic mower 1 to follow the guide wire 7 until the robotic mower 1 walks to the predetermined position. As shown in FIG. 25, S23 may further include: S231, as shown in FIG. 29 and FIG. 30, controlling the robotic mower 1 to straddle along the guide wire 7 for a preset time and then stop; S232, as shown in FIG. 31*a* to FIG. 31*d*, controlling the robotic mower 1 to follow the guide wire 7 to move toward the predetermined position at a first random distance.

Figure 31A:
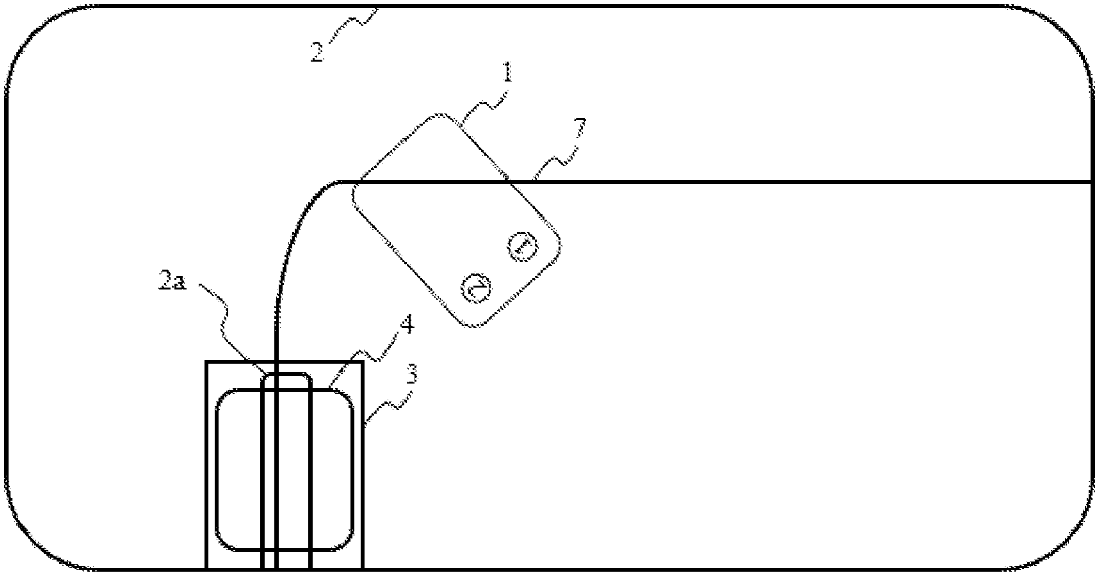
FIGS. 31*a* to 31*d* are schematic views of a robotic mower following a guide wire to a predetermined position with a first random distance according to another embodiment of the disclosure.
Figure 31B:
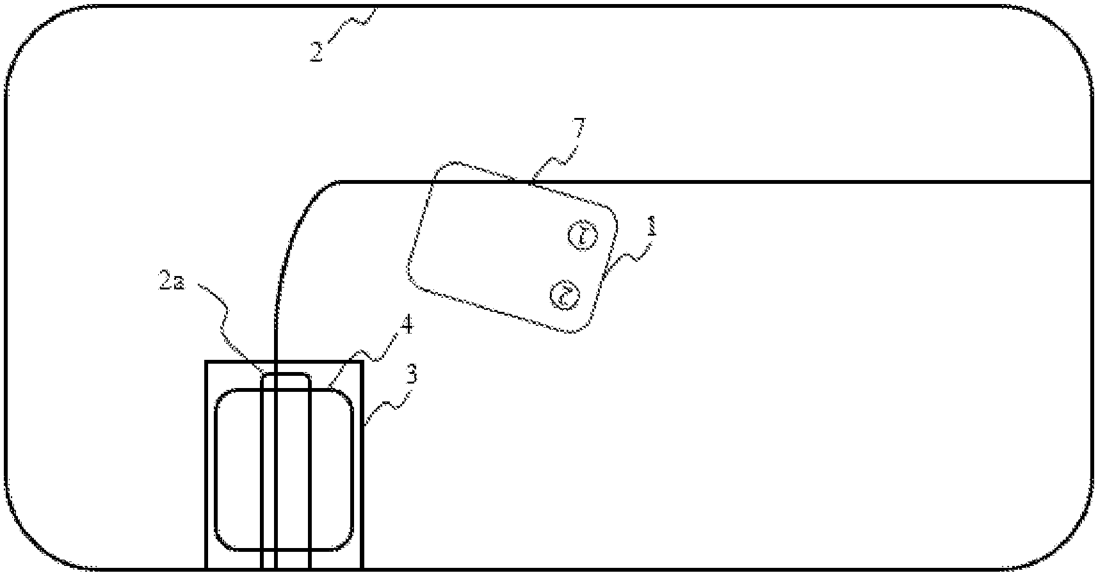
Figure 31C:
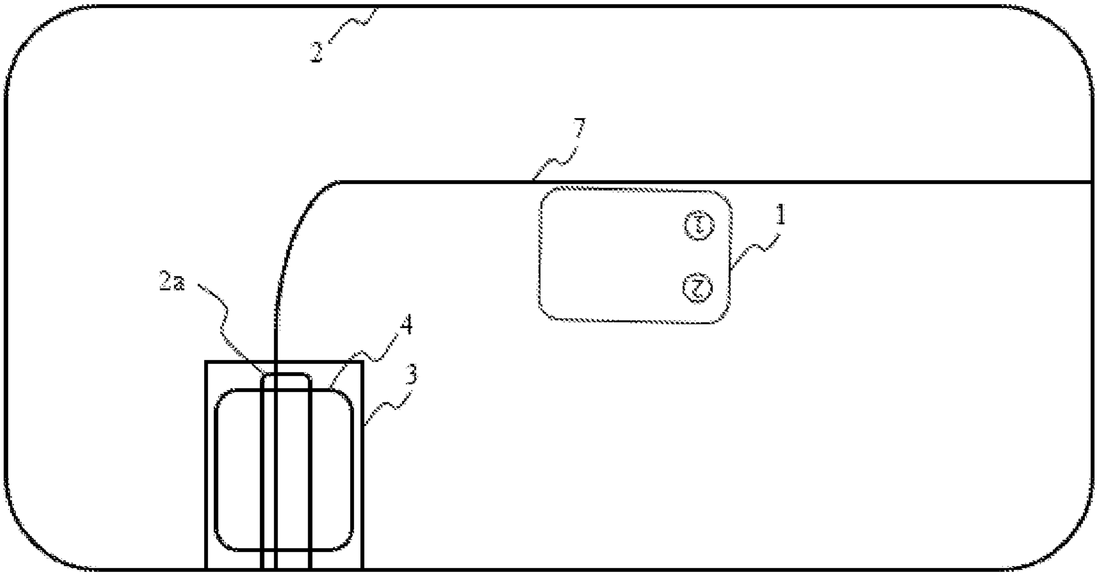
Figure 31D:
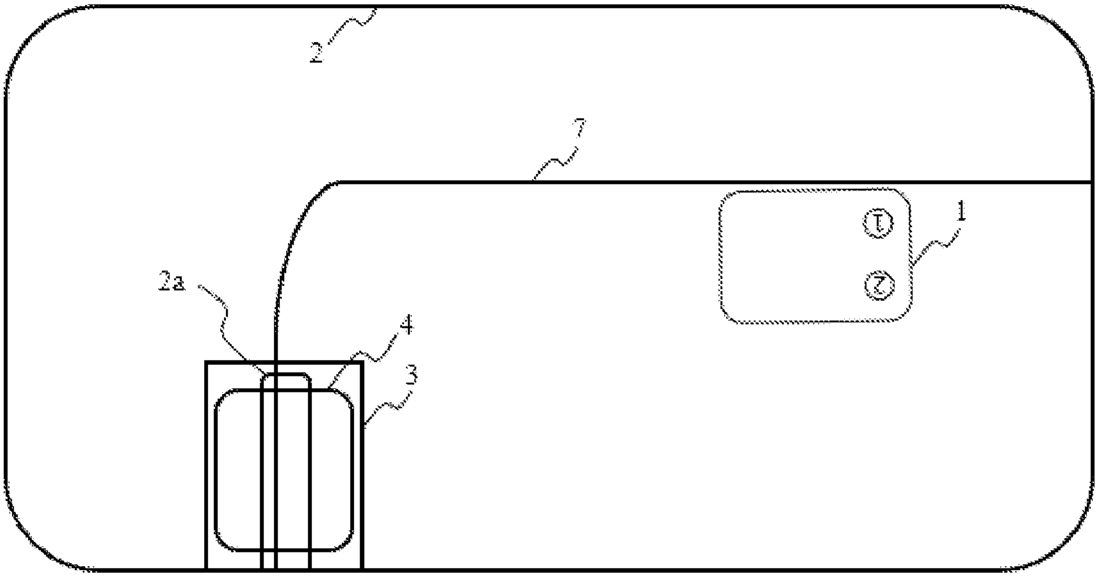

In S232, first, as shown in FIG. 31*a*, the robotic mower 1 is controlled to rotate a preset angle to either side of the guide wire 7 (upper or lower side in FIG. 31*a*) until the distance between one of the sensors 5 and the guide wire 7 is equal to the first random distance. Then, as shown in FIG. 31*a*, the robotic mower 1 is controlled to use the sensor 5 to detect the guiding signal of the guide wire 7 at this time to obtain the induced current. Finally, as shown in FIG. 31*b* to FIG. 31*d*, the robotic mower 1 is controlled to start to follow the guide wire 7 to move to the predetermined position with the amplitude of the induced current. It should be noted that the robotic mower 1 rotates to the side of the guide wire 7 at different preset angles, which means that different random distances can be obtained, so that the robotic mower 1 can follow the guide wire 7 to move to the predetermined position along a different path each time, which avoids repeated rolling to form tracks and affecting the growth of lawn or vegetation in the rut area. It should be noted that, in S232, for example, the distance between the first sensor or the second sensor far away from the guide wire 7 and the guide wire 7 in FIG. 31*a* can be selected as the first random distance.

Figure 32:
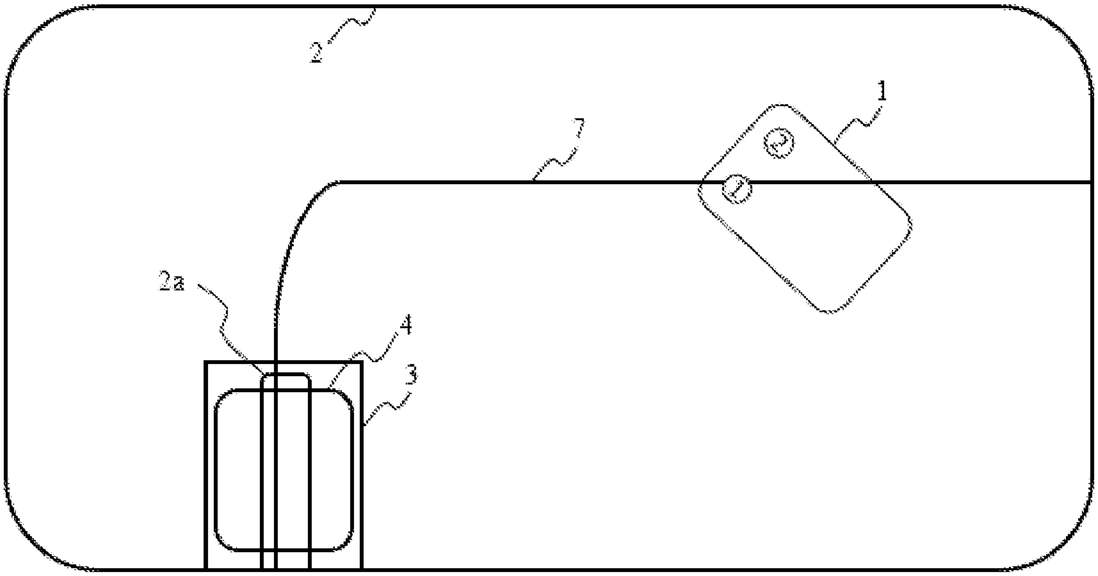
FIG. 32 is a schematic view of a random mowing operation after a robotic mower reaches a predetermined position according to another embodiment of the disclosure.
Figure 33:
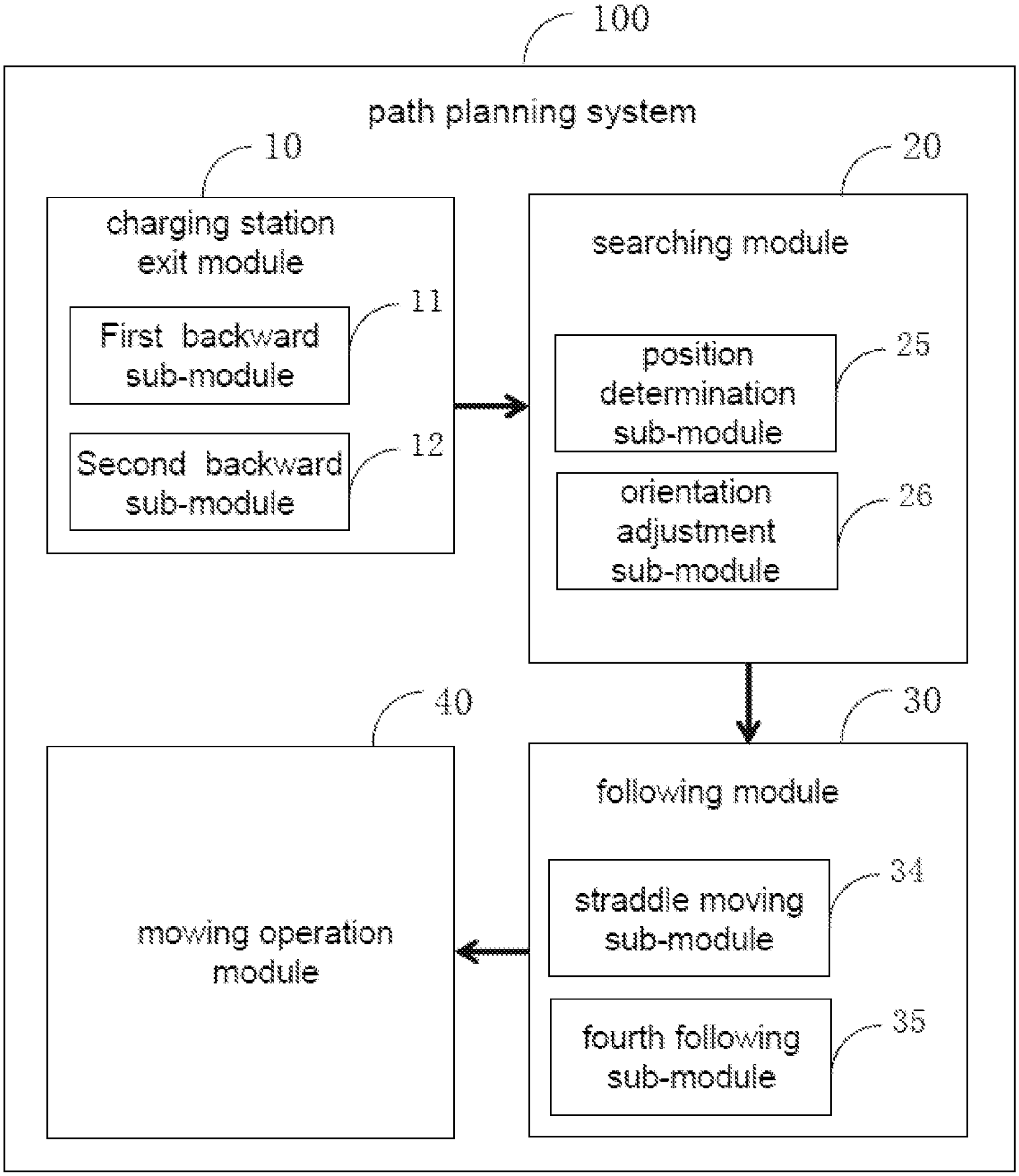
FIG. 33 is a schematic block view of a path planning system according to another embodiment of the disclosure.

Finally, S24 is executed, as shown in FIG. 31*d* and FIG. 32, when the total moving distance of the robotic mower 1 is detected the same as the set value, it means that the robotic mower 1 has reached the predetermined position, and then the robotic mower is controlled 1 to stop following the guide wire 7. The robotic mower 1 randomly rotates by an angle and then starts mowing within the working area defined by the boundary wire 2. As an example, the robotic mower 1 can mow in a random manner in the working area, and when mowing randomly, the robotic mower 1 can randomly rotate 360°. When the robotic mower 1 randomly rotates a random direction to mow forward, the robotic mower 1 will move in a straight line until it reaches the boundary wire 2 (whether the robotic mower 1 crosses the boundary wire 2 can be determined by the polarity of the induced current generated by the sensor 5 in response to the guiding signal of the boundary wire 2). When reaching the boundary wire 2, the robotic mower 1 will randomly rotate an angle inward to mow.

It should be noted that the division of operations in the various methods above is just for clarity of description. When implemented, it can be combined into one operation or some operations can be split into multiple operations, provided that the same logical relationship is contained, all falling within the scope of disclosure. Adding insignificant modifications to the algorithm or process or introducing insignificant design, but not changing the core design of the algorithm and process are within the scope of protection of the disclosure.

As shown in FIG. 33, the embodiment also introduces a path planning system of a robotic mower for realizing the path planning method of the above automatic mower. The path planning system of the robotic mower includes a charging station exit module 10, a searching module 20 (as a guide wire searching module), a following module 30 (as a guide wire following module), and a mowing operation module 40. The charging station exit module 10 is used to control the robotic mower 1 to exit the charging station 3. The searching module 20 is used to control the robotic mower 1 to find the guide wire 7 and to make the robotic mower 1 face away from the direction of the charging station 3, wherein the guide wire 7 is pre-laid in the working area of the robotic mower 1. The following module 30 is used to control the robotic mower 1 to follow the guide wire 2 to move until the robotic mower 1 reaches the predetermined position; the mowing operation module 40 is used to control the robotic mower 1 to start mowing in the working area after reaching the predetermined position.

Please refer to FIG. 33, the charging station exit module 10 further includes a first backward sub-module 11 and a second backward sub-module 12; the first backward sub-module 11 is used to control the robotic mower 1 to exit the charging station 3 after the charging is completed. The second backward sub-module 12 is used to control the robotic mower 1 to continue to reverse in a straight line for a random reverse distance when the robotic mower 1 exits outside the charging station loop 4.

Please refer to FIG. 33, the searching module 20 includes a position determination sub-module 25 and an orientation adjustment sub-module 26; the position determination sub-module 25 is used to determine the relative position of the robotic mower 1 and the guide wire 7. The orientation adjustment sub-module 26 is used to adjust the orientation of the robotic mower 1 according to the relative position of the robotic mower 1 and the guide wire 7 so that the robotic mower 1 can face away from the charging station 3.

Please refer to FIG. 33, the following module 30 further includes a straddle moving sub-module 34 and a fourth following sub-module 35; the straddle moving sub-module 34 is used to control the robotic mower 1 to move across the guide wire 7 for a preset time. The fourth following sub-module 35 is used to control the robotic mower 2 to follow the guide wire 7 to the predetermined position at a first random distance.

It should be noted that the path planning system of the robotic mower of this embodiment is a system corresponding to the path planning method of the robotic mower mentioned above, and the functional modules or functional sub-modules in the path planning system of the robotic mower respectively corresponds to the corresponding operations in the path planning method of the robotic mower. The path planning system of the robotic mower of this embodiment can be implemented in cooperation with the path planning method of the robotic mower. The relevant technical details mentioned in the path planning method of the robotic mower of this embodiment are still valid in the path planning system of the robotic mower. In order to reduce repetition, it will not be repeated here. Correspondingly, the relevant technical details mentioned in the path planning system of the robotic mower of this embodiment can also be applied to the path planning method of the robotic mower mentioned above.

It should be noted that the functional modules or functional sub-modules mentioned above can be fully or partially integrated into one physical entity during actual implementation, or also can be physically separated. And these modules can all be realized in the form of software called by processing elements; they can also be realized in the form of hardware; and part of the modules can be realized in the form of calling software by processing elements, part of the modules can be realized in the form of hardware. In addition, all or part of these modules can be integrated together or implemented independently. The processing element here can be an integrated circuit with signal processing capabilities. In the implementation process, each operation of the method mentioned above or each of the modules mentioned above can be completed by an integrated logic circuit of hardware in the processor 61 element or instructions in the form of software.

The path planning method of the robotic mower in this embodiment can also be implemented by a control unit 60 arranged on the body of the robotic mower 1. Please refer to FIG. 13, the control unit 60 includes a memory 63 and a processor 61 that are connected to each other. The memory 63 stores program instructions, and the program instructions are executed by the processor 61 to implement the path planning method of the robotic mower described above. It should be noted that, when it is necessary to communicate with the outside world, the control unit 60 further includes a communicator 62, and the communicator 62 is connected to the processor 61. For a detailed description of the control unit 60, please refer to the first embodiment, which will not be repeated here.

In summary, the robotic mower and its path planning method, system and device of this embodiment can be used to plan the path for the robotic mower to leave the charging station, so that the robotic mower leaves the charging station along a different path each time in order to avoid rutting when the robotic mower exits the station along a fixed path, which affects the growth of lawn or vegetation in the rutting area. The robotic mower and its path planning method, system and device of this embodiment can be used to plan the path for the robotic mower to leave the charging station, so that the robotic mower leaves the charging station along a different path each time, so that repeatedly mowing along the same path can be prevented, and the mowing efficiency and the beauty of the lawn can be improved. Since the guide wire can be arranged in a relatively simple shape as required, the robotic mower and its path planning method, system and device of this embodiment simplify the path planning of the robotic mower leaving the station through setting the guide wire.

The Third Embodiment

This embodiment provides a self-propelled power device, the self-propelled power device includes a body, driving wheels and supporting wheels arranged on the body, a working assembly, a power supply assembly, a GPS positioning system, a detection system, a data processing system, and a control system. The working assembly is used to implement or assist in implementing the operating functions of smart work device, such as the cutting assembly of the mower, the suction and sweeping assembly of the sweeping robot, etc., which are not limited here. Hereinafter, in this embodiment, a smart mower (also referred to as a robotic mower) is taken as an example for detailed description.

The smart mower 1 includes a body, a cutting assembly arranged on the body, a power supply assembly, a GPS positioning system, a detection system, a data processing system, and a control system. The body is provided with two driving wheels located on both sides of the body. The driving wheels are generally located at the rear of the body, and the two driving wheels are respectively driven by two driving motors. The front of the body is also provided with at least one supporting wheel. The smart mower is supported for travel by a moving assembly including the driving wheels and the supporting wheel. The supporting wheel is generally a universal wheel so that the smart mower 1 can turn.

The cutting assembly includes a cutting motor and a cutting component driven by the cutting motor. The cutting assembly is roughly located at the center of the mower, the rotation axis of the cutting motor is roughly perpendicular to the horizontal plane, and the cutting assembly can be adjusted by the operator to adjust the height from the ground, so as to adjust cutting height. The power supply assembly includes a rechargeable battery and a charging system that supplies power to the rechargeable battery.

Figure 34:
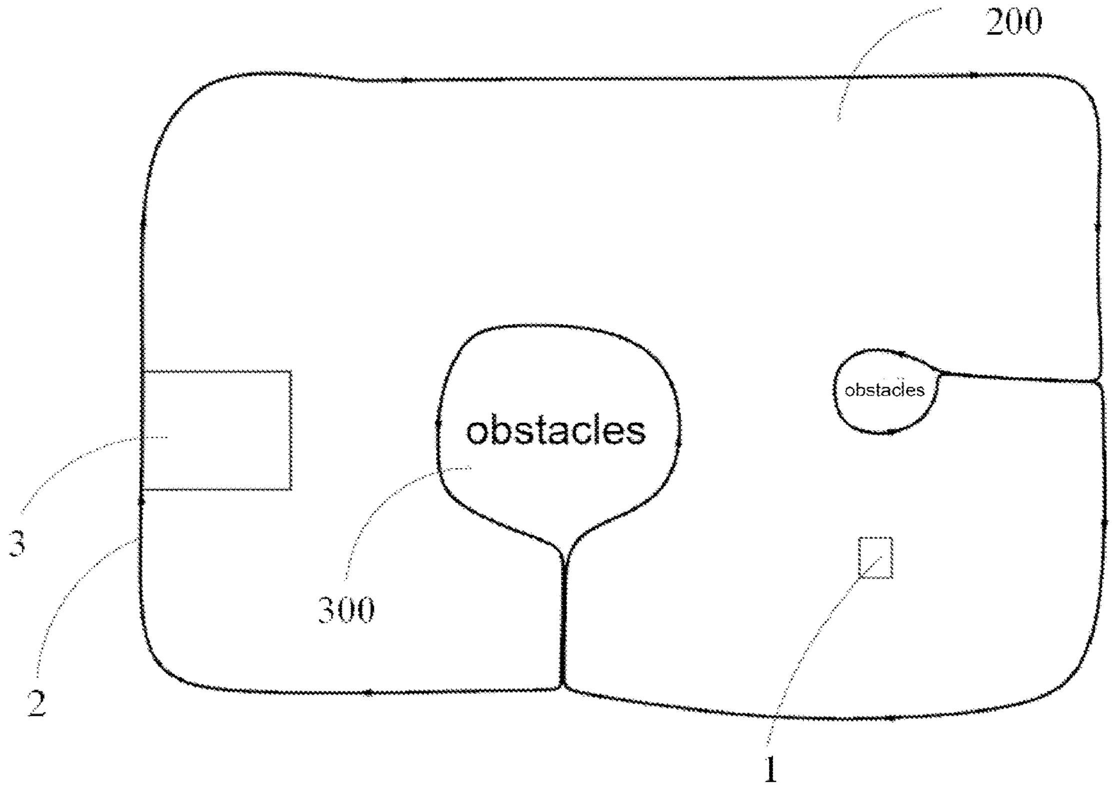
FIG. 34 is a schematic view of a distribution of a smart mower, working area and charging station of the disclosure.

Please refer to FIG. 34, which is a schematic view of a distribution of the smart mower 1 which needs to be returned for charging, the working area 200, and the charging station 3. The working area 200 of the smart mower 1 is defined by the boundary wire 40 (also called the boundary signal line). The charging station 3 is located on the boundary wire 40 and is used to charge the smart mower 1. Specifically, the boundary wire 40 is drawn from the positive terminal of the charging station 3, surrounds the working area 200 and the obstacle 300, and then is connected to the negative terminal of the charging station 3. The charging station 3 includes a signal generating device for generating a pulse signal of a certain frequency which leads to the boundary wire 40.

The GPS positioning system is used to obtain the current position of the smart mower 1. When the smart mower 1 is located at the charging station 3 for the first time, the GPS positioning system is further used to obtain the current position of the charging station 3. The detection system is used to obtain moving path of the smart mower 1

Figure 35:
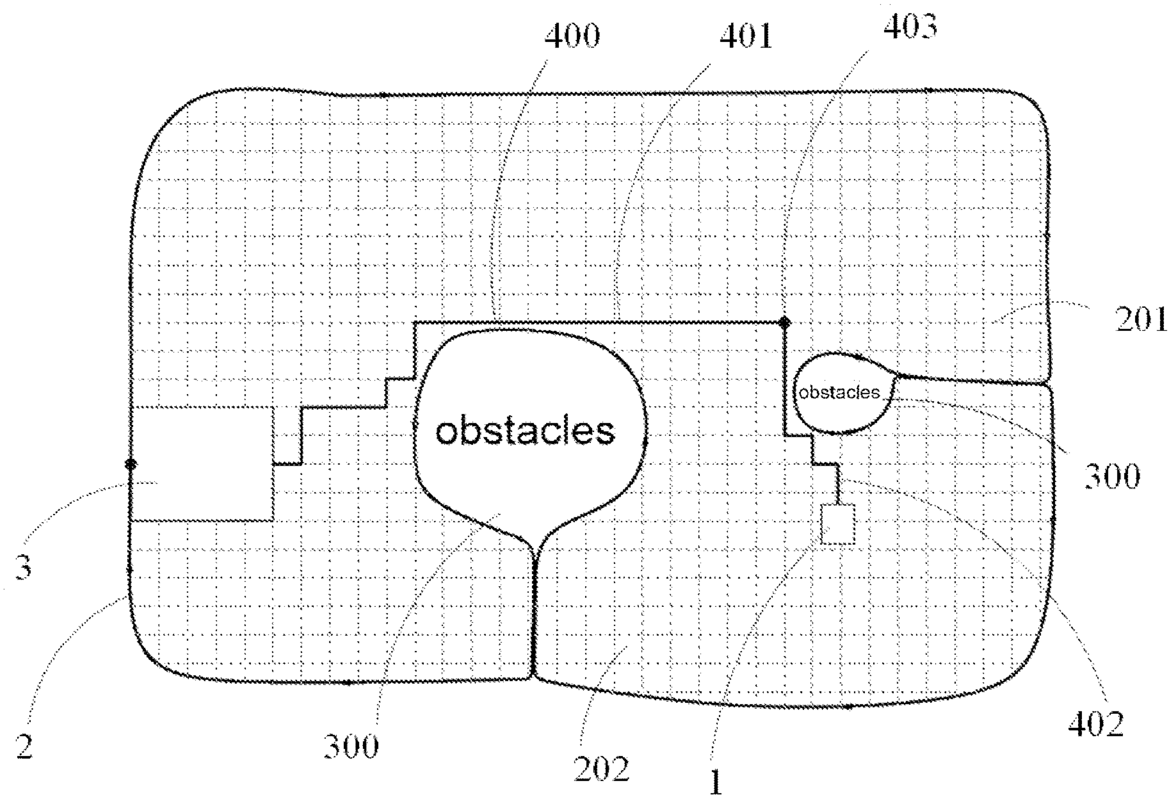
FIG. 35 is a schematic view of a virtual working area and a return path of the disclosure.

Please refer to FIG. 35, which is a schematic view of a virtual working area map 301 and a return path 400 of this embodiment. The data processing system is used to obtain the virtual working area map 301 corresponding to the working area 200 and divide the virtual working area map 301 into a number of virtual grids 202 to obtain the virtual positions of the smart mower 1 and the charging station 3 on the virtual working area map 301. In addition, the data processing system plans the X-axis direction path 401 from the position of the charging station 3 according to the virtual position, and plans the Y-axis direction path 402 from the position of the smart mower 1. When the X-axis direction path and the Y-axis direction path intersect at the intersection 403, a return path 400 will be generated.

Please refer to FIG. 35, the X-axis direction path 401 and the Y-axis direction path 402 are planned along the virtual grid 202. Specifically, between the charging station 3 and the intersection 403, the X-axis direction path 401 extends along the X-axis direction and deviates toward one side of the Y-axis, and is stepped. In this embodiment, according to the positions of the obstacle 300 and the smart mower 1, the planned path deviates to the left. In other embodiments, the difference in the position of the obstacle and the smart mower may cause the X-axis direction path to deviate to the right or to be a straight line extending along the X-axis direction.

Similarly, the Y-axis direction path 402 extends along the Y-axis direction and deviates toward one side of the X-axis, and is stepped. In this embodiment, according to the position of the obstacle 300 and the smart mower 1, the planned path deviates to the left. In other embodiments, the difference in the position of the obstacle and the smart mower may cause the Y-axis direction path to deviate to the right or be a straight line extending along the Y-axis direction. In addition, since the X-axis direction path 401 and the Y-axis direction path 402 are planned along the virtual grid 202, therefore, when the X-axis direction path 401 and the Y-axis direction path 402 deviate to one side, they deviate by at least one grid.

The control system is used to control the movement of the smart mower 1. Specifically, the control system controls the moving direction and speed of the smart mower 1 by controlling the rotation speeds of the two driving motors. When the rotation speeds of the driving motors are different, the smart mower 1 can turn. When the rotation speeds of the driving motor are the same, the smart mower 1 can move linearly. When the rotation speed of the driving motor is reversed, the smart mower 1 can turn in situ at zero-position. After the data processing system completes the planning of the return path 400, the control system controls the smart mower 1 to move along the Y-axis direction path 402 and the X-axis direction path 401 in sequence, and return to the charging station 3.

Figure 36:
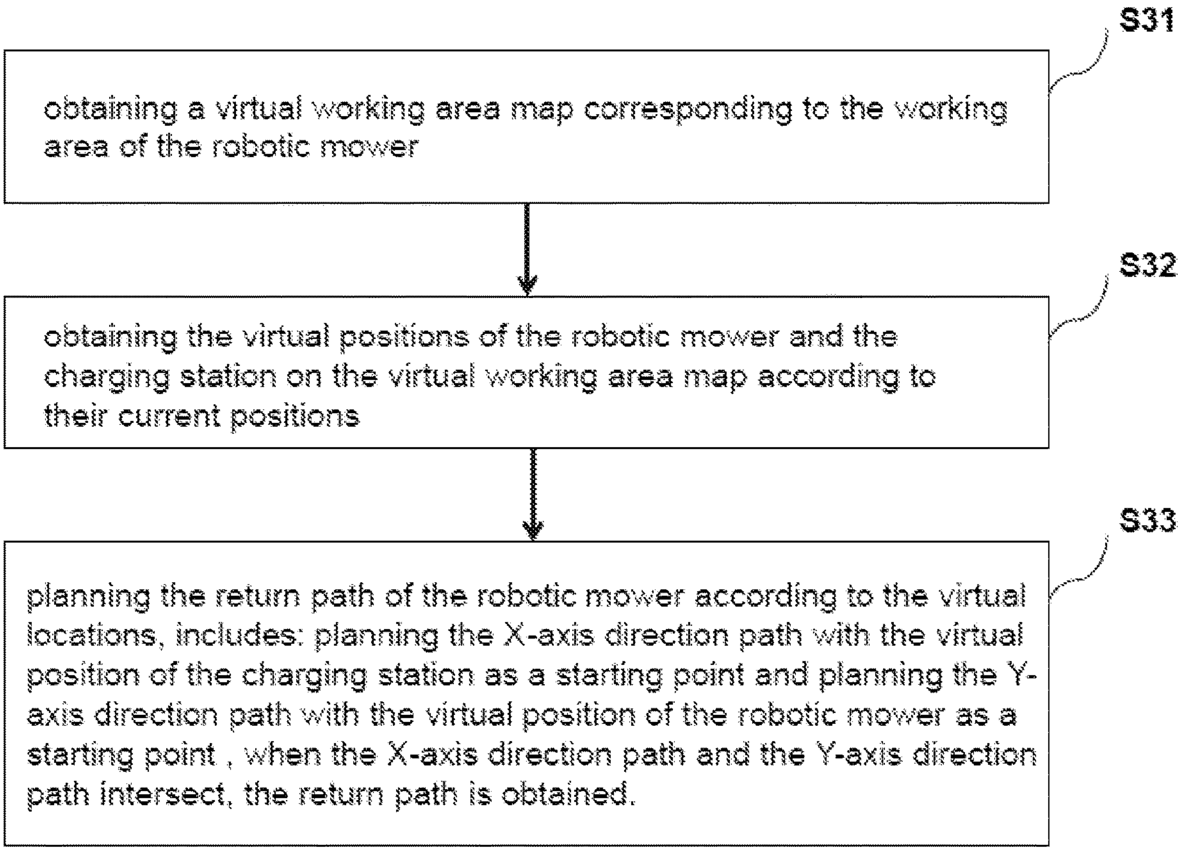
FIG. 36 is a schematic flow chart of a return path planning method of a self-propelled power device of the disclosure.

Please refer to FIG. 35 and FIG. 36. The method for planning the return path of the smart mower 1 provided in this embodiment includes the following steps:

S31, obtaining a virtual working area map 301 corresponding to the working area 200 of the smart mower 1.

S32, obtaining the virtual positions of the smart mower 1 and the charging station 3 on the virtual working area map 301 according to current positions thereof, and S33, planning the return path 400 of the smart mower 1 according to the virtual locations, including: planning the X-axis direction path 401 with the virtual position of the charging station 3 as a starting point and planning the Y-axis direction path 402 with the virtual position of the smart mower 1 as a starting point. When the X-axis direction path 401 and the Y-axis direction path 402 intersect, the return path 400 is obtained.

Wherein, S31 includes: setting a boundary wire 40 on the boundary of the working area 200, the smart mower 1 moving a circle along the boundary wire 40 and detecting the moving path to obtain a virtual working area map 301. Specifically, the smart mower 1 automatically moves along the boundary wire 40 after starting and returns to the charging station 3. The detection system defines a virtual working area map 301 with the moving path in a circle of the smart mower 1 through the data processing system.

S32 includes: defining the position of the charging station 3 as the origin of the coordinate; comparing the current position of the smart mower 1 with the virtual working area map 301 to obtain the corresponding virtual position of the smart mower 1 on the virtual working area map 301. Specifically, when the smart mower 1 is activated in the charging station, the GPS positioning system locates the initial position of the smart mower 1 in the charging state, the initial position being the current position of the charging station 3. The data processing system takes this initial position as the origin of the coordinates. When the smart mower 1 needs to return to the charging station 3 for charging after working in the working area 200, the GPS positioning system locates the current position of the smart mower 1 in the working area 200. The data processing system compares the current position of the smart mower 1 with the virtual working area map 301 to obtain the virtual position of the smart mower 1.

S33 includes: dividing the virtual working area map 301 into a number of virtual grids 202. In addition, the virtual grid 202 is only formed inside the working area surrounded by the boundary wire 40 and does not exceed the boundary wire 40. The size of the virtual grid 202 can be designed according to actual needs, and is not limited here. The X-axis direction path 401 and the Y-axis direction path 402 are planned according to the virtual positions of the charging station 3 and the smart mower 1.

Figure 37:
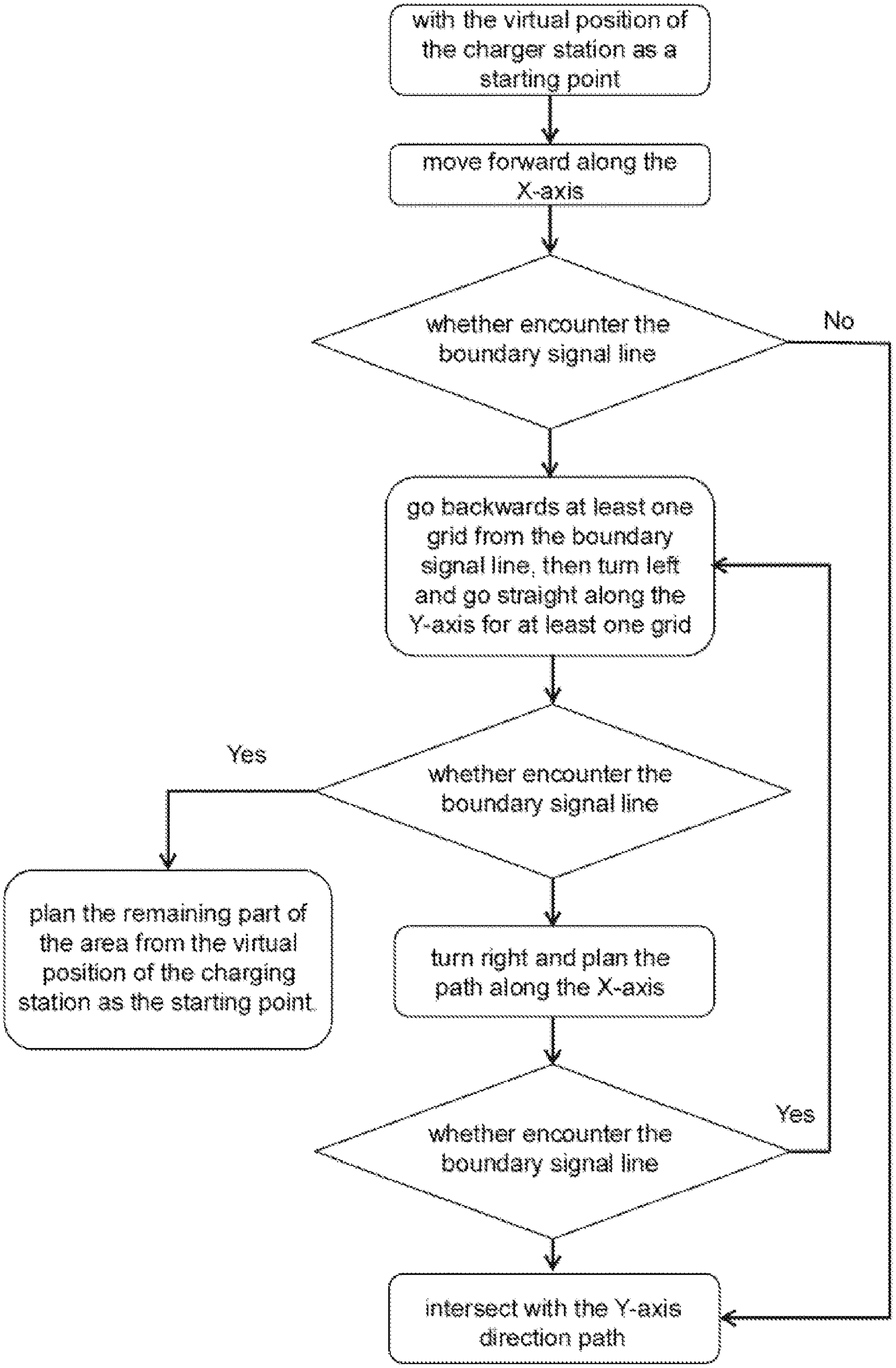
FIG. 37 is a partial logical schematic view of planning an X-axis direction path according to the disclosure.

Specifically, please refer to FIG. 37, which is a partial logic schematic view of planning an X-axis direction path 401 with the virtual position of the charging station 3 as a starting point. Take the virtual position of the charging station 3 as the starting point and move forward along the X-axis. If it encounters the boundary wire 40, the X-axis direction path will go backwards at least one grid from the boundary wire 40, then turn and go straight along the Y-axis for at least one grid, then turn back to the X-axis direction and continue to plan the path in the same way, in which the turning direction is always the same until the X-axis direction path intersects the Y-axis direction path or the boundary wire 40 is encountered when moving along the Y-axis linearly.

When the boundary wire 40 is encountered along the Y-axis, the X-axis direction path is re-planned from the virtual position of the charging station 3, specifically: When encountering the boundary wire 40 along the X-axis direction, the X-axis direction path will go backwards at least one grid from the boundary wire 40, and then goes straight for at least one grid in the direction opposite to the previous turning direction, which means that it turns right and go straight for at least one grid, and then turns back to the X-axis direction and continue to plan the path in the same way. The turning direction is always the same until the X-axis direction path and the Y-axis direction path intersect.

Please refer to FIG. 35 together. When planning the X-axis direction path 401, the virtual working area map 301 is divided into two parts along the X-axis direction based on the charging station 3. In this embodiment, the upper area can be planned first, which means that the X-axis direction path 401 is obtained. It is also possible to plan the lower area first. Due to the blockage of the boundary wire 40, a path that intersects the Y-axis direction path cannot be obtained in this area, and the remaining part of the area, namely the upper area, needs to be planned from the virtual position of the charging station 3 as the starting point. At last, an X-axis direction path 401 is formed in the upper region.

Figure 38:
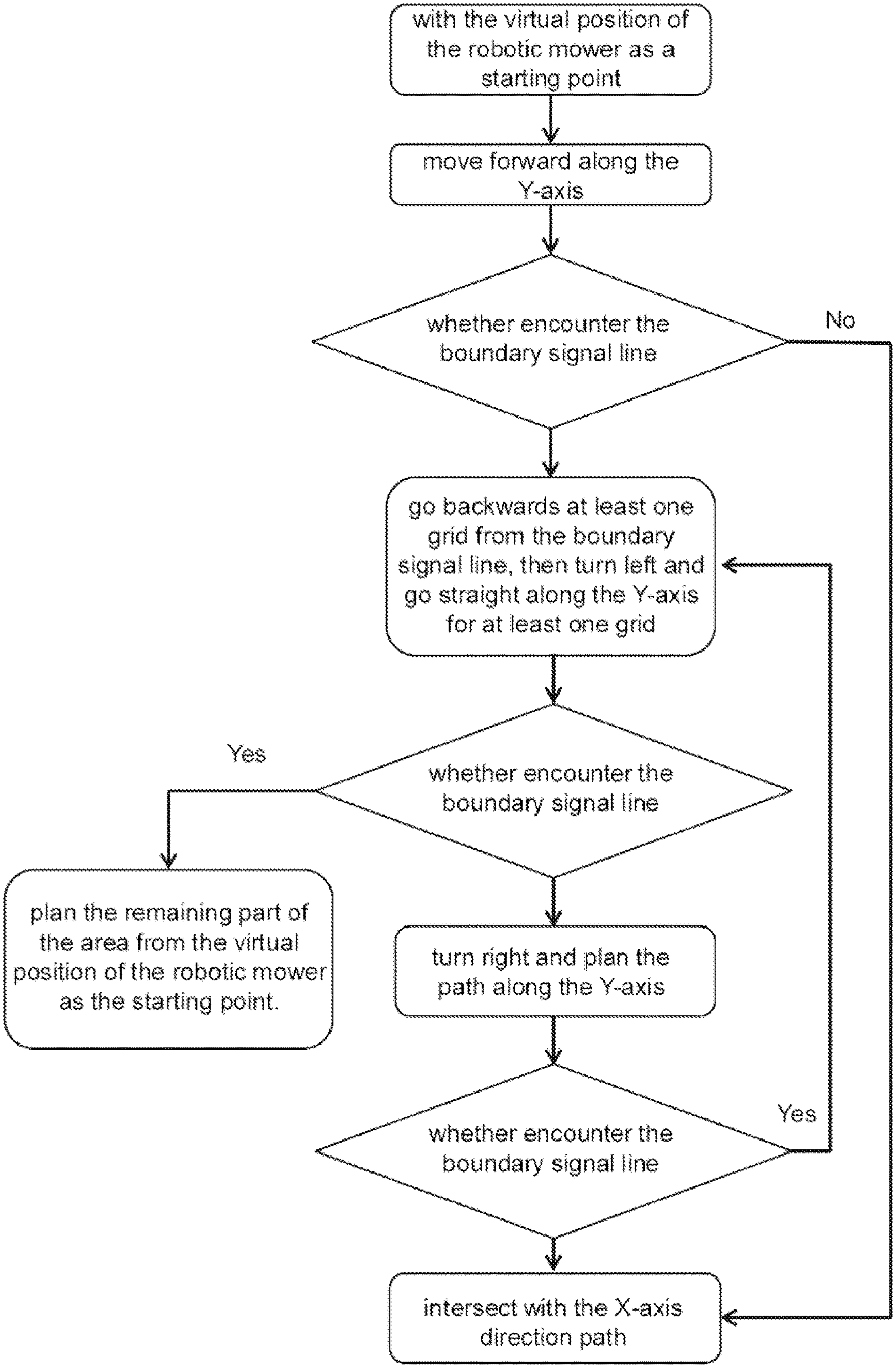
FIG. 38 is a partial logical schematic view of planning a Y-axis direction path according to the disclosure.

Please refer to FIG. 38, which is a partial schematic logic view of planning the Y-axis direction path with the virtual position of the smart mower 1 as a starting point. The Y-axis direction path planning method is roughly similar to the X-axis direction path planning method, specifically: setting the virtual position of the smart mower 1 as the starting point and the smart mower 1 moving forward along the Y-axis direction. If the Y-axis direction path encounters the boundary wire 40, the Y-axis direction path will go backwards at least one grid from the boundary wire 40, and then it will turn and go straight along the X-axis for at least one grid. And then it will turn back to the Y-axis direction and continue to plan the path in the same way, the turning direction is always the same, in this embodiment, the turning direction is turning left until the Y-axis direction path 402 and the X-axis direction path 401 intersect or until the boundary wire 40 is encountered when going straight along the X-axis.

When the boundary wire 40 is encountered along the X-axis, the Y-axis direction path 402 is re-planned from the virtual position of the smart mower 1, specifically as follows: when encountering the boundary wire 40 along the Y-axis direction, the Y-axis direction path goes backwards at least one grid from the boundary wire 40, and then goes straight for at least one grid in the direction opposite to the previous turning direction, which means that it turns right and goes straight for at least one grid, and then turns back to the Y-axis direction and continue to plan the path in the same way. The turning direction is always the same until the Y-axis direction path 402 and the X-axis direction path 401 intersect.

Please refer to FIG. 35 together. When planning the Y-axis direction path 402, the virtual working area map 301 is divided into two parts which are left part and right part along the Y-axis direction based on the smart mower 1. In this embodiment, by choosing to plan the left area first, the Y-axis direction path 402 can be directly obtained. If the right area is chosen to plan first, the Y-axis path cannot be obtained in this area due to the blockage of the boundary wire 40; therefore, the remaining area, i.e. the left area, needs to be planned with the virtual position of the smart mower 1 as the starting point; finally, a Y-axis direction path 402 is formed in the left area.

The X-axis direction path 401 and the Y-axis direction path 402 intersect and obtain an intersection 403. In this way, a complete return path 400 from the smart mower to the charging station 3 is obtained. Preferably, a number of return paths 400 are planned and the shortest return path among them is selected. The control system controls the smart mower 1 to move along the Y-axis direction path 402 and the X-axis direction path 401 in sequence, and return to the charging station 3. It should be noted that when charging is required, a return path that is different from the return path performed last time will be planned. Such a setting can avoid repeated rolling of the lawn and reduce the damage to the lawn.

In summary, the smart mower of this embodiment forms the working area into a corresponding virtual working area map, and the X-axis direction path and the Y-axis direction path are planned on the virtual working area map. With this setting, the return path has been planned during recharging to effectively avoid obstacles in the working area. The smart mower does not need to be adjusted for multiple times to avoid obstacles and prevent the smart mower from being exhausted before returning to the charging station. In addition, the virtual work area map is divided into several equal virtual grids, and a shorter return path can be selected according to the distribution of the virtual grids, so that the path of the smart mower back to the charging station is shorter, which reduces the amount of recharging that needs to be reserved, saves recharging time, and increases the working time of the smart mower. Correspondingly, reducing the number of charging can effectively increase the service life of the battery cell. Furthermore, the smart mower forms a virtual grid, and there is no need to actually arrange guide wires in the working area, which not only reduces the manufacturing cost of the product, but also simplifies the operations and improves the user experience. The return path planned each time in this embodiment is different from the one executed last time, so it is possible to avoid repeated rolling of the lawn and reduce the damage to the lawn.

The above embodiments are only used to illustrate the disclosure but not to limit the technical solutions described in the disclosure. The understanding of this specification should be based on those skilled in the art. Although this specification has described the disclosure in detail with reference to the embodiments mentioned above, those skilled in the art should understand that those skilled in the art can still modify or equivalently replace the disclosure. All technical solutions and improvements that do not depart from the spirit and scope of the disclosure should be covered by the scope of the claims of the disclosure.

What is claimed is:

1. A path planning method of a robotic mower, comprising:

controlling the robotic mower to exit a charging station, searching for a boundary wire or a guide wire, the boundary wire being pre-laid on a boundary of a working area and the guide wire being pre-laid in the working area, and following the boundary wire or the guide wire to move until the robotic mower reaches a predetermined destination, comprising straddling along the boundary wire in a first direction until the robotic mower finds a straight boundary area section of the boundary wire, moving backward on and along the straight boundary section of the boundary wire in a direction opposite to the first direction by a second random backward distance, the second random backward distance being less than or equal to a length of the straight boundary section, rotating a second preset angle toward a center of the working area to adjust a moving direction of the robotic mower, the second preset angle being less than 180 degrees, moving forward until a distance between the robotic mower and the boundary wire is a first preset distance, the first preset distance being a random value;

rotating the second preset angle back to keep the moving direction of the robotic mower parallel to the boundary wire or the guide wire, the distance between the robotic mower and the boundary wire still being the first preset distance, and following the boundary wire at the first preset distance until the robotic mower reaches the predetermined destination, the distance between the robotic mower and the boundary wire remaining the first preset distance when following the boundary wire at the first preset distance, wherein the boundary wire defines an outer boundary loop and an inner boundary loop, a charging station loop substantially defines a position of the charging station, the charging station loop and the inner boundary loop each is arranged inside the charging station, the outer boundary loop defines the boundary of the working area, the charging station is arranged on the outer boundary loop and shares a common edge with the outer boundary loop and the inner boundary loop, the boundary wire is recessed into the working area at the position of the charging station to define the inner boundary loop, the inner boundary loop is narrower than the charging station loop, passed through and intersected with the charging station loop, and configured to guide the robotic mower to exit the charging station, and pulse current signals are input to the boundary wire, the guide wire and the charging station loop respectively in an interval manner to produce corresponding guiding signals in different time intervals, the outer boundary loop and the inner boundary loop both are defined by the boundary wire and produce same guiding signals.

2. The path planning method of the robotic mower according to claim 1, wherein exiting the charging station comprises:

exiting the charging station after charging is completed, and continuing straight backward for a first random backward distance when the robotic mower exits out of the charging station loop arranged in the charging station.

3. The path planning method of the robotic mower according to claim 1, further comprising:

starting mowing in a random manner within the working area defined by the boundary wire after reaching the predetermined destination.

4. The path planning method of the robotic mower according to claim 1, wherein following the guide wire until the robotic mower reaches the predetermined destination comprises:

riding across the guide wire for a preset time, and following the guide wire to the predetermined destination at a first random distance.

5. The path planning method of the robotic mower according to claim 4, wherein finding the guide wire to make the robotic mower face a direction away from the charging station comprises:

determining a relative position of the robotic mower and the guide wire, and adjusting a position of the robotic mower according to the relative position of the robotic mower and the guide wire, so that the robotic mower is capable of facing away from the charging station.

6. The path planning method of the robotic mower according to claim 1, further comprising a return path planning method, wherein the return path planning method comprises:

obtaining a virtual working area map corresponding to the working area of the robotic mower, obtaining virtual positions of the robotic mower and the charging station in the virtual working area map according to current positions thereof, and planning a return path of the robotic mower according to the virtual positions, comprising:

planning an X-axis direction path with the virtual position of the charging station as a starting point;

planning a Y-axis direction path with the virtual position of the robotic mower as a starting point, obtaining the return path when the X-axis direction path intersects with the Y-axis direction path.

7. The path planning method of the robotic mower according to claim 6, wherein the virtual working area map is divided into a plurality of virtual grids, and the X-axis direction path and the Y-axis direction path are planned along the plurality of virtual grids.

8. The path planning method of the robotic mower according to claim 1, wherein, searching for the boundary wire or the guide wire comprises:

controlling the robotic mower to rotate to any side of the charging station at a first preset angle, and a left or right rotation of the robotic mower depends on that the robotic mower leaving along a left or right side of the boundary wire;

controlling the robotic mower to follow the charging station loop to move to the boundary wire;

when the robotic mower is partially located outside the boundary wire, controlling the robotic mower to stop moving; and controlling the robotic mower to rotate to the side away from the charging station until at least half of the robotic mower is located inside the boundary wire;

wherein the predetermined destination is a random point with the first preset distance from the boundary wire; and wherein the method further comprises controlling the robotic mower to start mowing in the working area after reaching the predetermined destination.

9. A path planning system of a robotic mower, configured to perform the path planning method of the robotic mower according to claim 1, comprising:

a charging station exit module, used to control the robotic mower to exit a charging station, a searching module, used to control the robotic mower to find a boundary wire or a guide wire, and the searching module comprising a first rotating sub module configured to control the robotic mower to rotate to any side of the charging station at a first preset angle and a second rotating sub-module configured to control the robotic mower to rotate to a side away from the charging station until at least half of the robotic mower is inside of the boundary wire, wherein the boundary wire is pre-laid on an edge of a working area, and the guide wire is pre-laid in the working area, and a following module, used to control the robotic mower to follow the boundary wire or the guide wire to move until the robotic mower reaches a predetermined destination and the following module comprising a third rotating sub-module configured to control the robotic mower to rotate toward a center of the working area at a second preset angle and a fourth rotating sub-module configured to control the robotic mower to rotate at the second preset angle to keep a moving direction of the robotic mower unchanged before and after adjustment.

10. The path planning system of the robotic mower according to claim 9, further comprising a return path planning module, wherein the return path planning module is configured to:

obtain a virtual working area map corresponding to the working area of the robotic mower, obtain virtual positions of the robotic mower and the charging station on the virtual working area map according to current positions thereof, and plan a return path of the robotic mower according to the virtual positions, comprising:

planning an X-axis direction path with the virtual position of the charging station as a starting point;

planning a Y-axis direction path with the virtual position of the robotic mower as a starting point, obtaining the return path when X-axis direction path intersects with the Y-axis direction path.

11. The path planning system of the robotic mower according to claim 9 further comprising:

a mowing operation module, used to control the robotic mower to start mowing within the working area defined by the boundary wire after reaching the predetermined destination.

12. The path planning system of the robotic mower according to claim 9, wherein, the charging station exit module further comprises a first backward sub-module configured to control the robotic mower to exit the charging station after the charging is completed and a second backward sub-module configured to control the robotic mower to continue to move back in a straight line for a first random backward distance when the robotic mower exits the charging station loop, and a left or right rotation of the robotic mower depends on that the robotic mower leaving along a left or right side of the boundary wire;

wherein the predetermined destination is a random point with the first preset distance from the boundary wire; and wherein the method further comprises controlling the robotic mower to start mowing in the working area after reaching the predetermined destination.

13. A robotic mower, comprising:

a body, at least one sensor arranged at a front end of the body, and a control unit, arranged on the body, the control unit comprising a processor and a memory coupled to each other, wherein the memory stores program instructions, when the program instructions stored in the memory are executed by the processor, the control unit is capable of:

exiting a charging station, finding a boundary wire or a guide wire, wherein the boundary wire is pre-laid on an edge of a working area and the guide wire is pre-laid in the working area, and following the boundary wire or the guide wire to move until the robotic mower reaches a predetermined destination, comprising:

straddling along the boundary wire in a first direction until the robotic mower finds a straight boundary section of the boundary wire, moving backward on and along the straight boundary section of the boundary wire in a direction opposite to the first direction by a second random backward distance, the second random backward distance being less than or equal to a length of the straight boundary section, and rotating a second preset angle toward a center of the working area to adjust a moving direction of the robotic mower, the second preset angle being less than 180 degrees, moving forward until a distance between the robotic mower and the boundary wire is a first preset distance, the first preset distance being a random value;

rotating the second preset angle back to keep a moving direction of the robotic mower parallel to the boundary wire or the guide wire, the distance between the robotic mower and the boundary wire still being the first preset distance, and following the boundary wire at the first preset distance until the robotic mower reaches the predetermined destination, the distance between the robotic mower and the boundary wire remaining the first preset distance when following the boundary wire at the first preset distance, wherein the boundary wire defines an outer boundary loop and an inner boundary loop, a charging station loop substantially defines a position of the charging station, the charging station loop and the inner boundary loop each is arranged inside the charging station, the outer boundary loop defines the boundary of the working area, the charging station is arranged on the outer boundary loop and shares a common edge with the outer boundary loop and the inner boundary loop, the boundary wire is recessed into the working area at the position of the charging station to define the inner boundary loop, the inner boundary loop is narrower than the charging station loop, passed through and intersected with the charging station loop, and configured to guide the robotic mower to exit the charging station, and pulse current signals are input to the boundary wire, the guide wire and the charging station loop respectively in an interval manner to produce corresponding guiding signals in different time intervals, the outer boundary loop and the inner boundary loop both are defined by the boundary wire and produce same guiding signals.

14. A non-transitory computer readable storage medium, comprising:

a program which, when run on a computer, makes the computer to perform the path planning method of the robotic mower according to claim 1.

15. A path planning device of the robotic mower, using the path planning method of the robotic mower according to claim 1, comprising at least one guide wire, wherein the guide wire is pre-laid in the working area of the robotic mower, two ends of the guide wire are respectively connected to the charging station and the boundary wire, and the guide wire and the boundary wire define a closed loop.

16. The path planning device of the robotic mower according to claim 15, wherein the guiding signal comprises an alternating magnetic field, and a sensor on the robotic mower comprises a magnetic induction coil.

17. The path planning device of the robotic mower according to claim 16, wherein the robotic mower has two sensors, the two sensors being symmetrically arranged on both sides of a center line of a front end of a body of the robotic mower.

18. The robotic mower according to claim 13, wherein, the control unit is further capable of:

searching for the boundary wire or the guide wire comprises:

controlling the robotic mower to rotate to any side of the charging station at a first preset angle, and a left or right rotation of the robotic mower depends on that the robotic mower leaving along a left or right side of the boundary wire;

controlling the robotic mower to follow the charging station loop to move to the boundary wire;

when the robotic mower is partially located outside the boundary wire, controlling the robotic mower to stop moving; and controlling the robotic mower to rotate to the side away from the charging station until at least half of the robotic mower is located inside the boundary wire;

wherein the predetermined destination is a random point with the first preset distance from the boundary wire; and wherein the method further comprises controlling the robotic mower to start mowing in the working area after reaching the predetermined destination.

* * * * *